Figure 1:
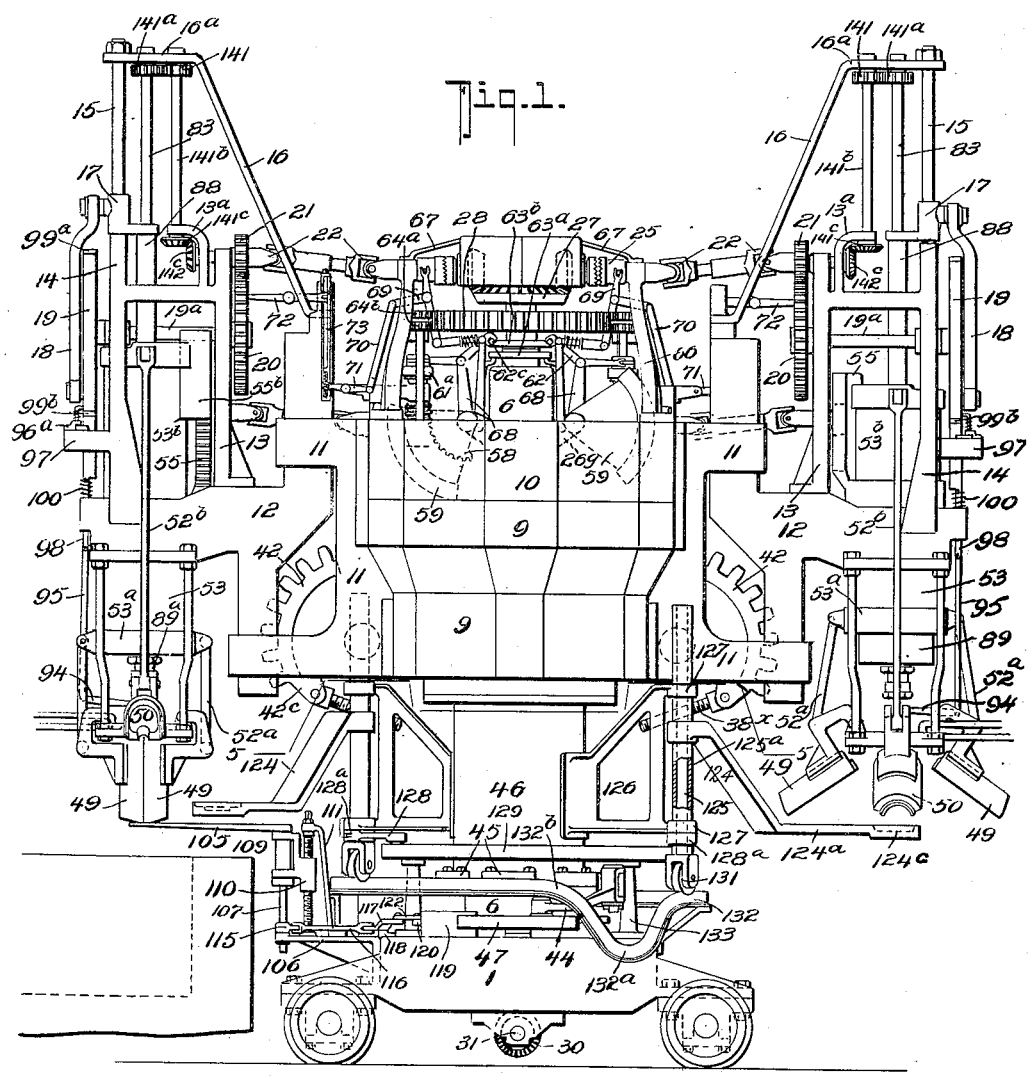

C. J. KOENIG.
MECHANISM FOR PRODUCING HOLLOW GLASSWARE.
APPLICATION FILED DEC. 13, 1906.

940,165.

Patented Nov. 16, 1909.
16 SHEETS—SHEET 3.

WITNESSES:
F. C. Gibson.
John T. Schrott.

INVENTOR
Christian Julius Koenig.
BY
Fred G. Dieterich & Co.
ATTORNEYS

C. J. KOENIG.
MECHANISM FOR PRODUCING HOLLOW GLASSWARE.
APPLICATION FILED DEC. 13, 1906.

940,165.

Patented Nov. 16, 1909.
16 SHEETS—SHEET 7.

WITNESSES:
F. C. Gibson.
John T. Schrott.

INVENTOR
Christian Julius Koenig.
BY
Fred G. Dieterich & Co.
ATTORNEYS

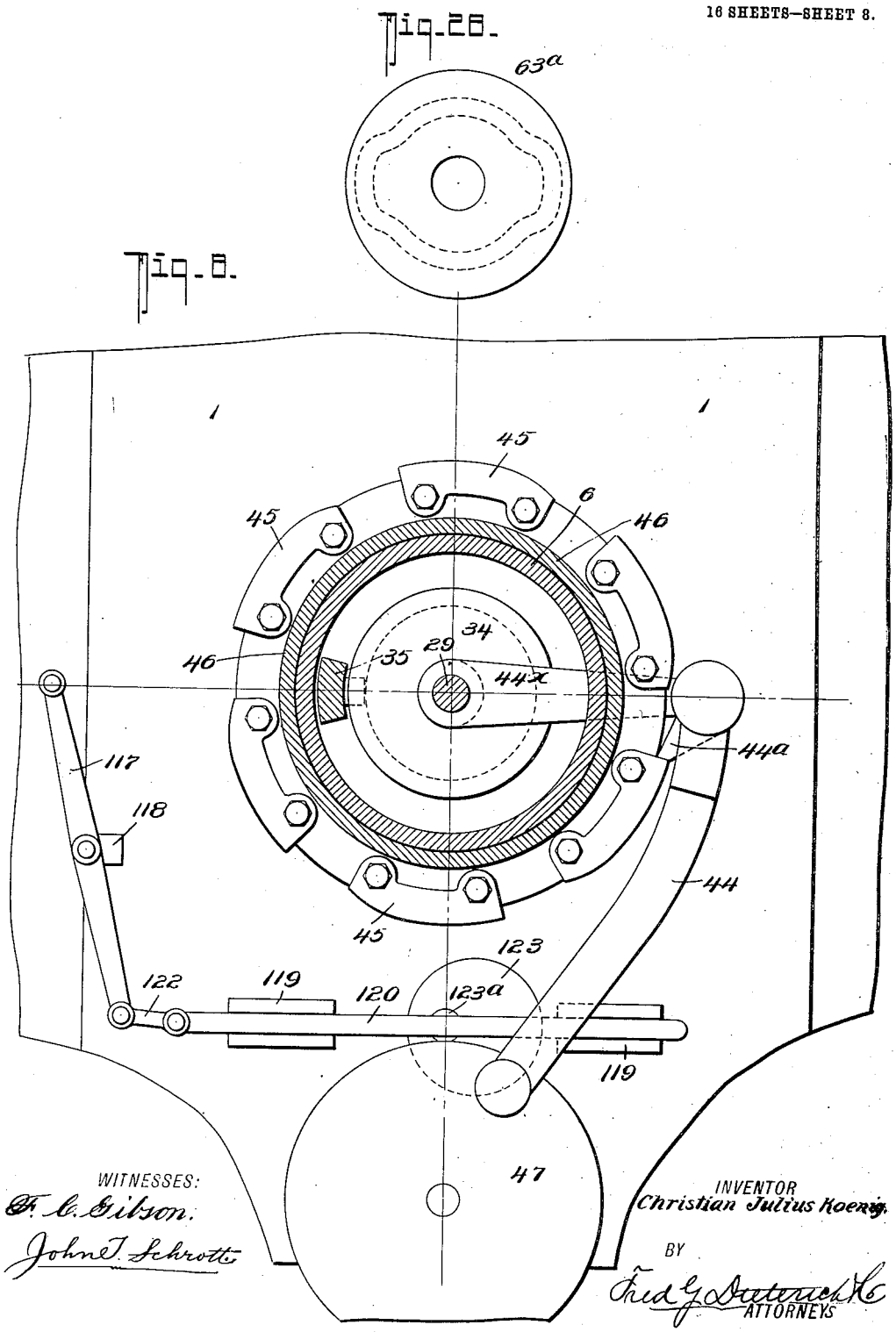

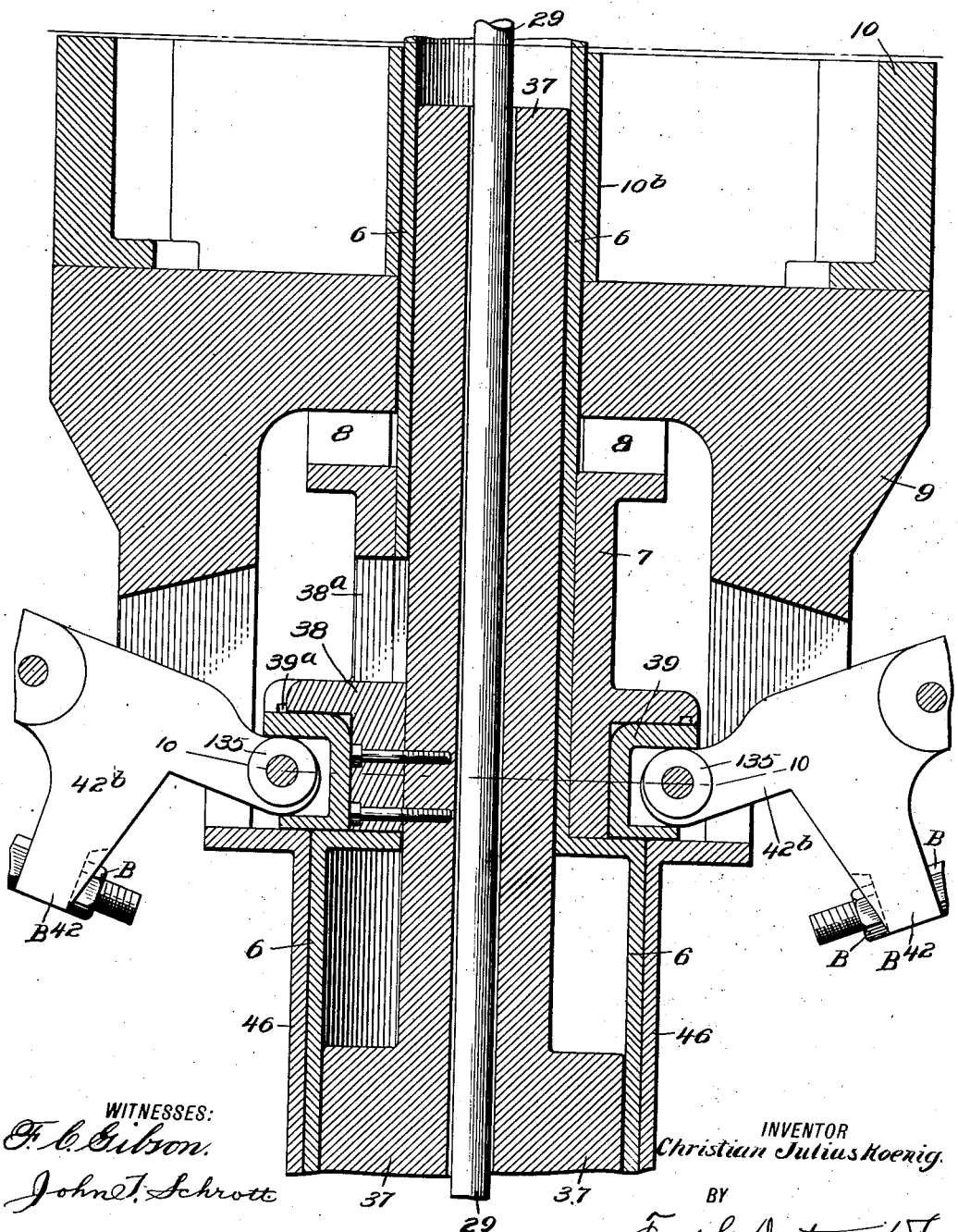

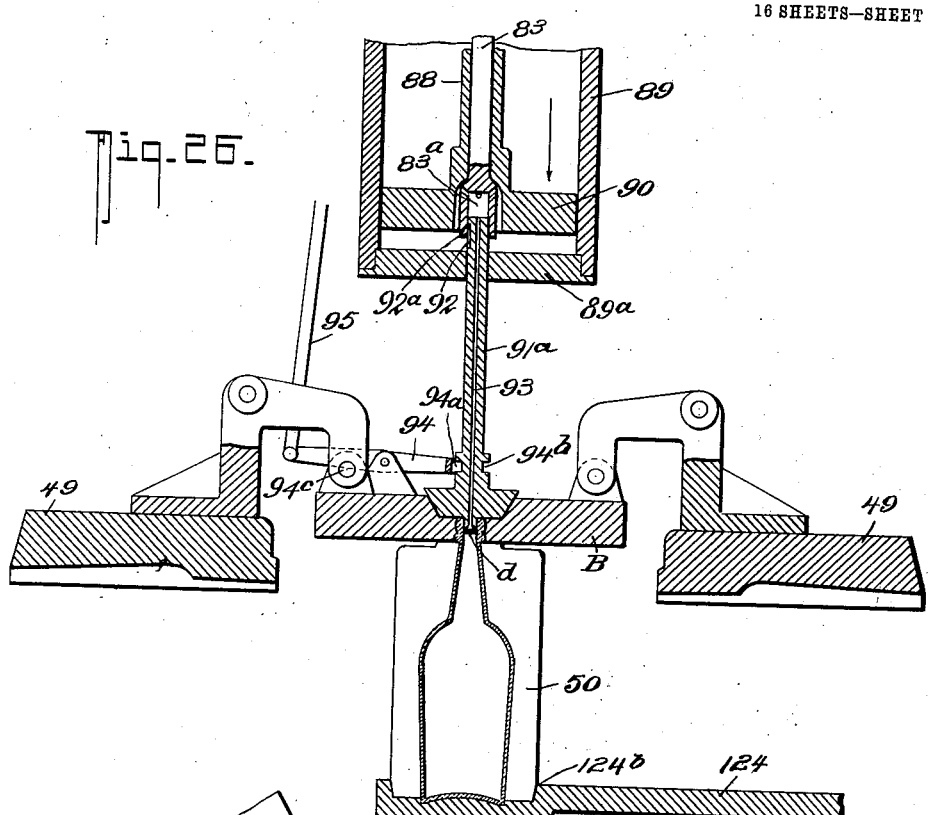

C. J. KOENIG.
MECHANISM FOR PRODUCING HOLLOW GLASSWARE.
APPLICATION FILED DEC. 13, 1906.
940,165.
Patented Nov. 16, 1909.
16 SHEETS—SHEET 11.
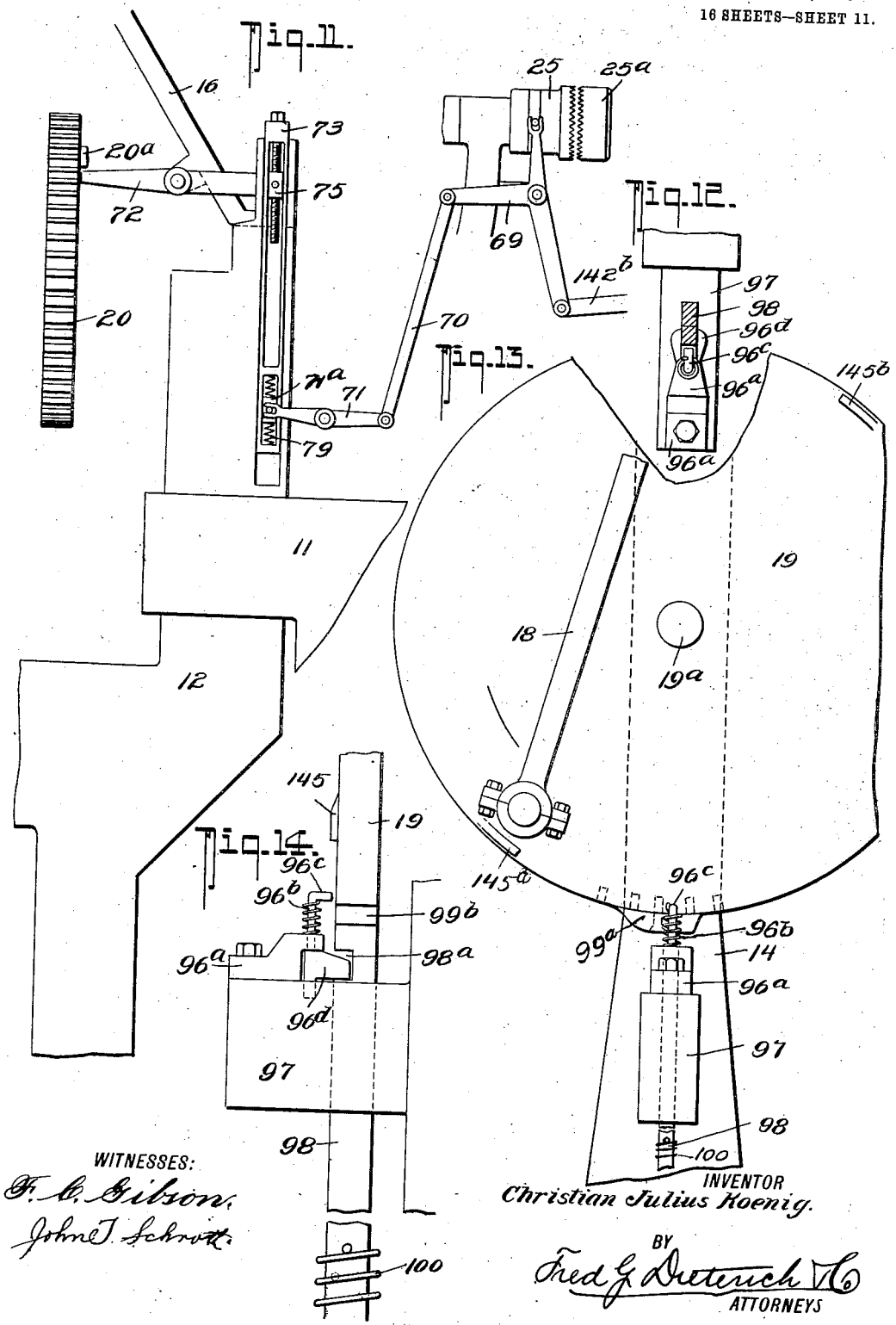
WITNESSES:
F. C. Gibson.
John T. Schrott.
INVENTOR
Christian Julius Koenig.
BY
Fred G. Dieterich
ATTORNEYS C. J. KOENIG.
MECHANISM FOR PRODUCING HOLLOW GLASSWARE.
APPLICATION FILED DEC. 13, 1906.
940,165.
Patented Nov. 16, 1909.
16 SHEETS—SHEET 12.
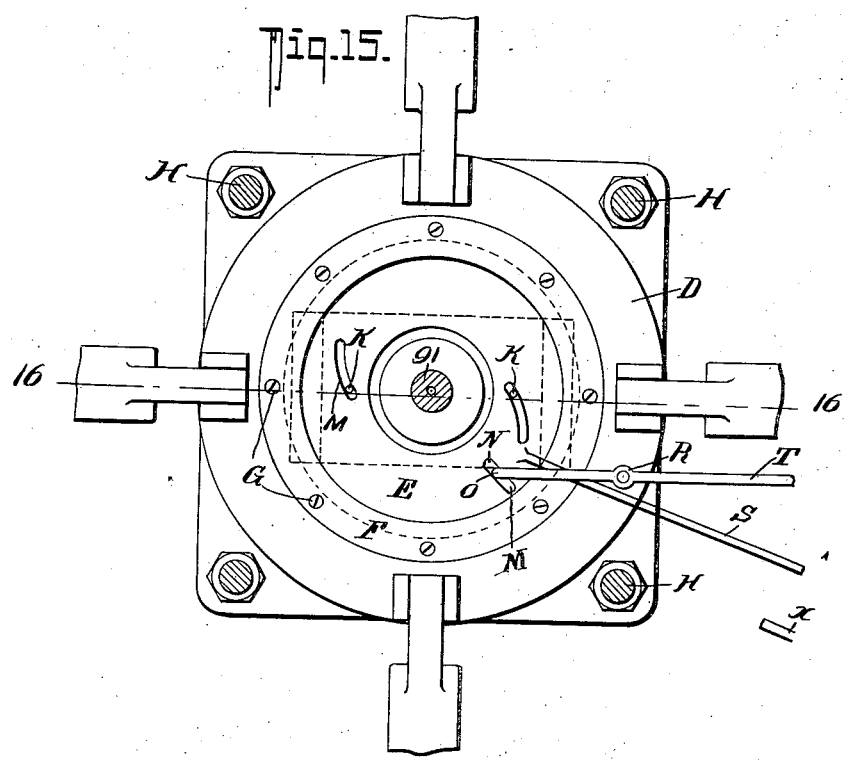
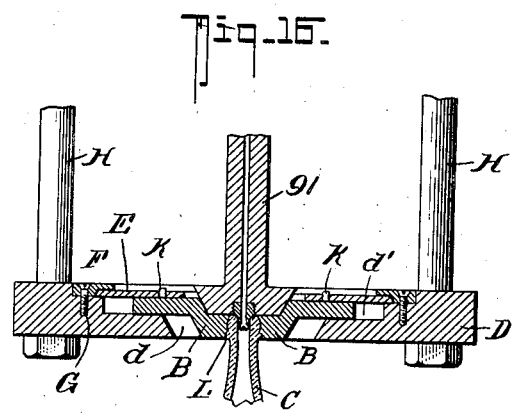
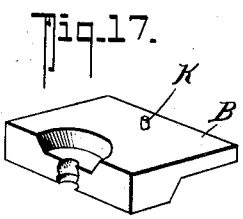
WITNESSES:
F. C. Gibson.
John T. Schrott.
INVENTOR
Christian Julius Koenig.
BY
Fred G. Dieterich & Co.
ATTORNEYS C. J. KOENIG.
MECHANISM FOR PRODUCING HOLLOW GLASSWARE.
APPLICATION FILED DEC. 13, 1906.
940,165.
Patented Nov. 16, 1909.
16 SHEETS—SHEET 13.
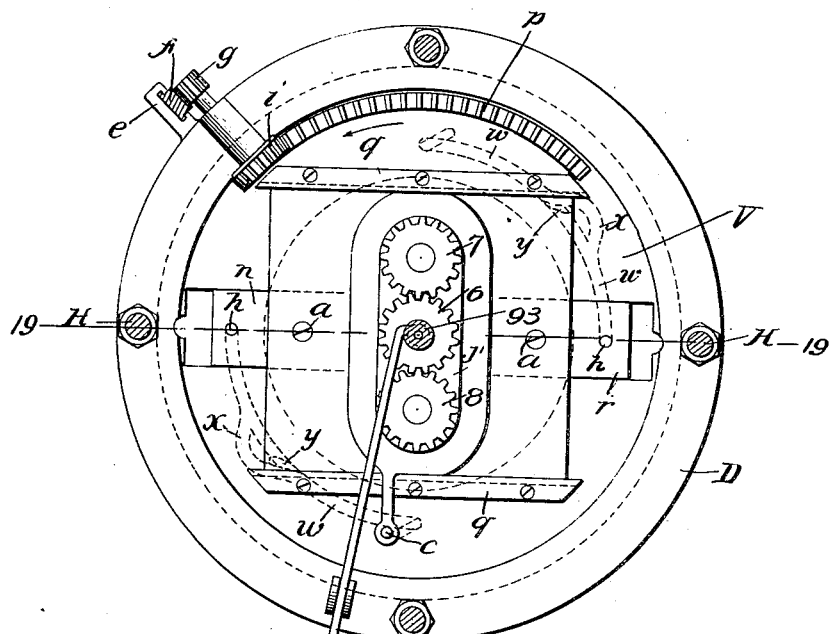
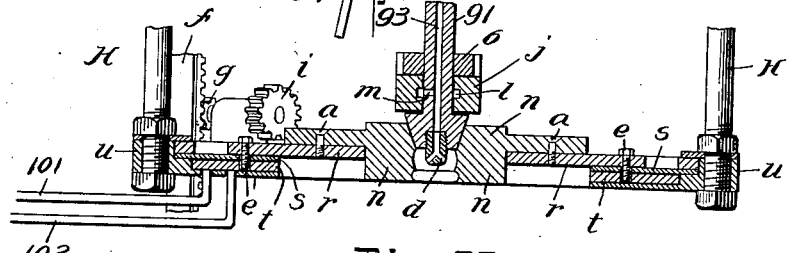
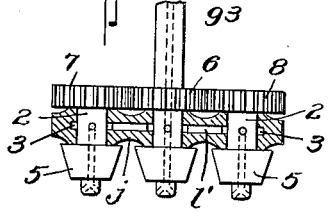
WITNESSES:
F. C. Gibson
John T. Schrott
INVENTOR
Christian Julius Koenig.
BY
Fred G. Dieterich & Co.
ATTORNEYS

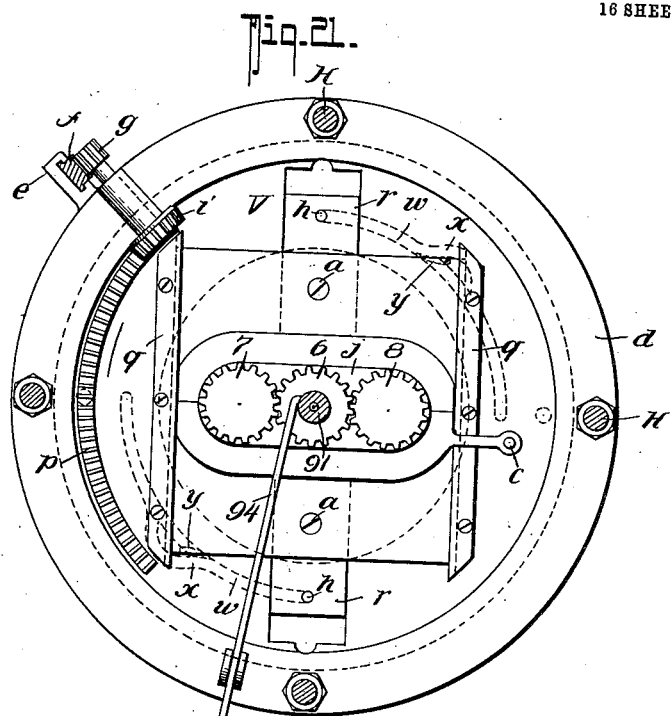

C. J. KOENIG.
MECHANISM FOR PRODUCING HOLLOW GLASSWARE.
APPLICATION FILED DEC. 13, 1906.
940,165.
Patented Nov. 16, 1909.
16 SHEETS—SHEET 15.
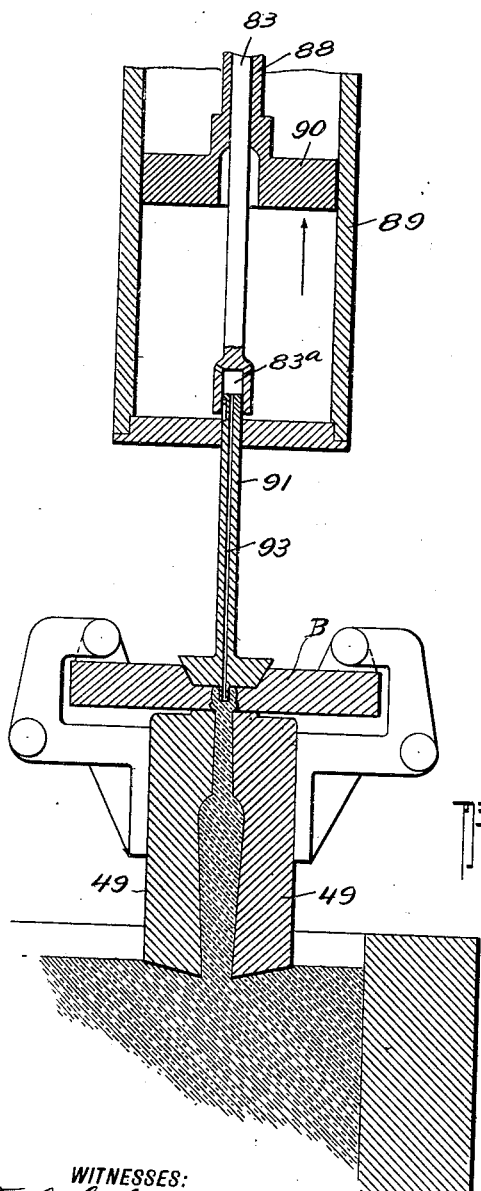
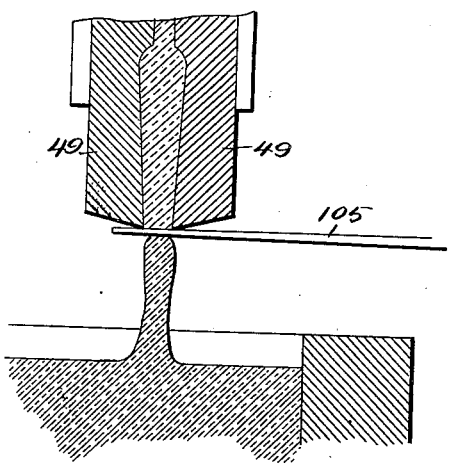
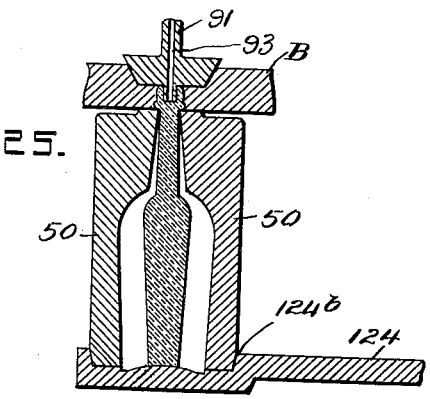
WITNESSES:
INVENTOR
Christian Julius Koenig.
BY
Fred G. Dieterich & Co
ATTORNEYS

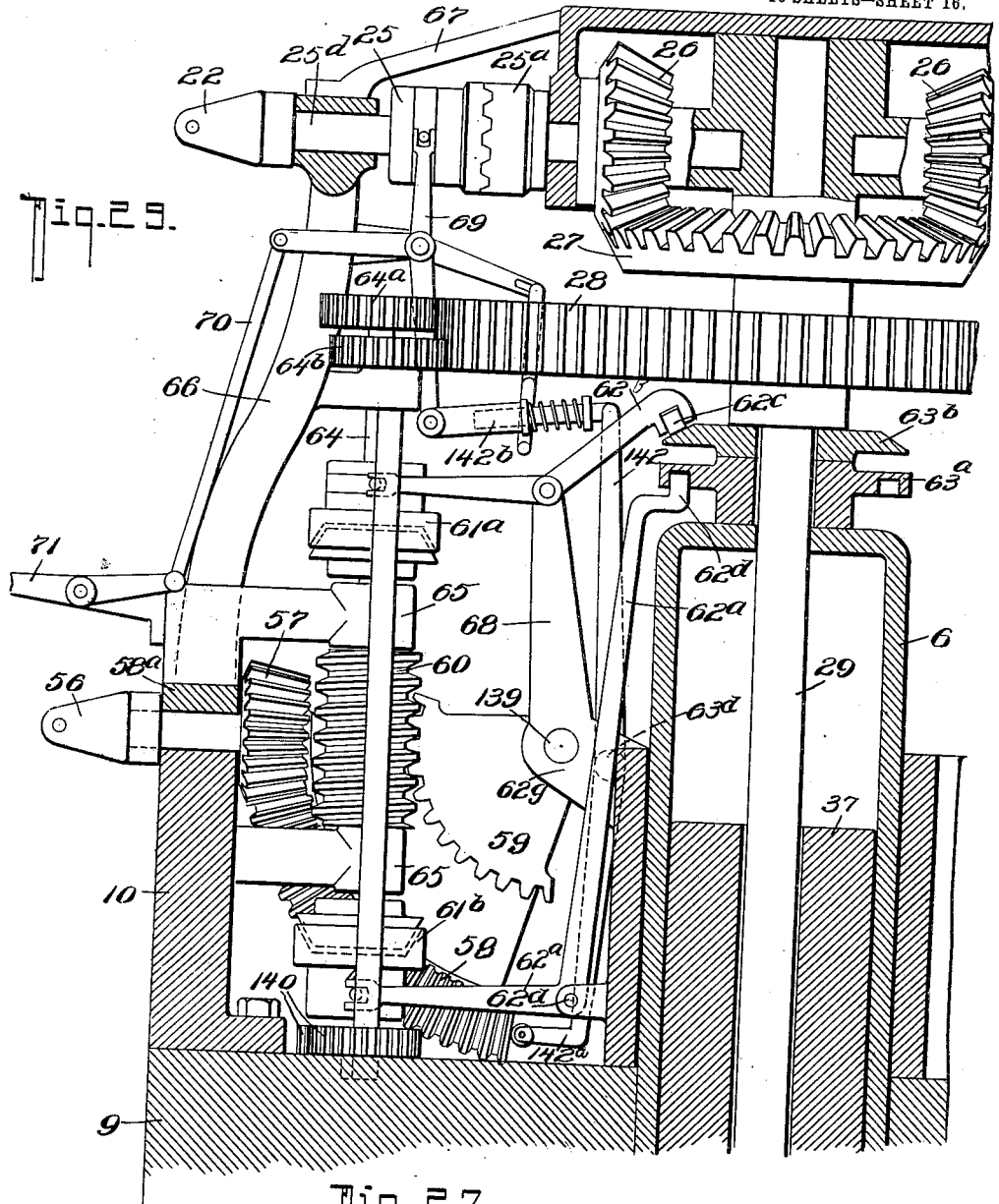

UNITED STATES PATENT OFFICE.

CHRISTIAN JULIUS KOENIG, OF ALTON, ILLINOIS.

MECHANISM FOR PRODUCING HOLLOW GLASSWARE.

940,165.  Specification of Letters Patent.  Patented Nov. 16, 1909.

Application filed December 13, 1906. Serial No. 347,716.

*To all whom it may concern:*

Be it known that I, CHRISTIAN JULIUS KOENIG, residing at Alton, in the county of Madison and State of Illinois, have invented a new and Improved Mechanism for Producing Hollow Glassware, of which the following is a specification.

My invention, which seeks to provide an improved means for the manufacture of hollow glass ware, more particularly relates to improvements in that class of glass shaping machines, in which is embodied a mechanism for first gathering the glass and giving the gathered glass an initial or fore-formed shape, and then blowing the initial or fore-formed mass into the true form or shape.

My invention primarily seeks to provide a machine for the purposes stated, having great capacity, in which a plurality of independently acting mechanisms are provided, controlled by an actuating means common to the several independently acting mechanisms, the said mechanisms being arranged to operate successively and substantially continuously and in pairs, one set of each of the independently actuating mechanisms being controlled and operated to gather the glass and effecting the fore or initial form to the ware as the other one of the said set of independently actuating mechanisms is operated to produce the final forming of the ware and finishing the same, the several parts being also so coöperatively combined whereby each set of independently actuating mechanisms will produce a plurality of the articles being made and in such manner that the machine of great capacity, is provided and capable of being operated under a minimum expense.

With the above objects in view and for other objects to be hereinafter explained, my present invention comprehends, in its general nature, an automatically actuated mechanism for simultaneously gathering a plurality of charges of glass and giving the said charges the primary or fore-form as a prior set of primarily formed plurality of charges are being shaped to the finishing or true form.

My present invention also comprehends an improved means for gathering the charge under the action of a partial vacuum and simultaneously giving the said charge the initial or fore-form, and means for forcing out the air in the vacuum chamber for blowing the initially formed charges to their final or finished shape.

Again, this invention embodies, in coöperation with a separable mold for initially shaping the glass charge, another separable mold for giving the final shape to the glass charge and a pneumatic mechanism adapted under one movement to fill the first separable mold with a glass charge and under the other movement thereof to blow the initially shaped glass body to its final form in the other separable or finishing mold.

Again, in its more complete nature, this invention includes a vertically adjustable frame, glass gathering and shaping means sustained thereon and consisting of two separable or divided molds which operate, one to impart an initial shape and another to impart the final or finished shape to the article being made and a pump coöperating with the said molds, automatically actuated at predetermined times for first filling the initially shaping mold with molten glass, by a suction operation, and then blowing the initial form to its finished shape in the final shaping mold.

Again, this invention comprehends a pair of separable molds, means for controlling the intermittent opening and closing of the two separable molds and a single means operated under one movement to create a partial vacuum for one set of the molds, and under another movement operating to blow the initially formed article to its final shape, in the other set of molds.

In its still more subordinate features, my present invention consists in certain combinations and peculiar constructions of parts, all of which will be hereinafter fully described, specifically pointed out in the appended claims, and illustrated in the accompanying drawings, in which:—

Figure 2:
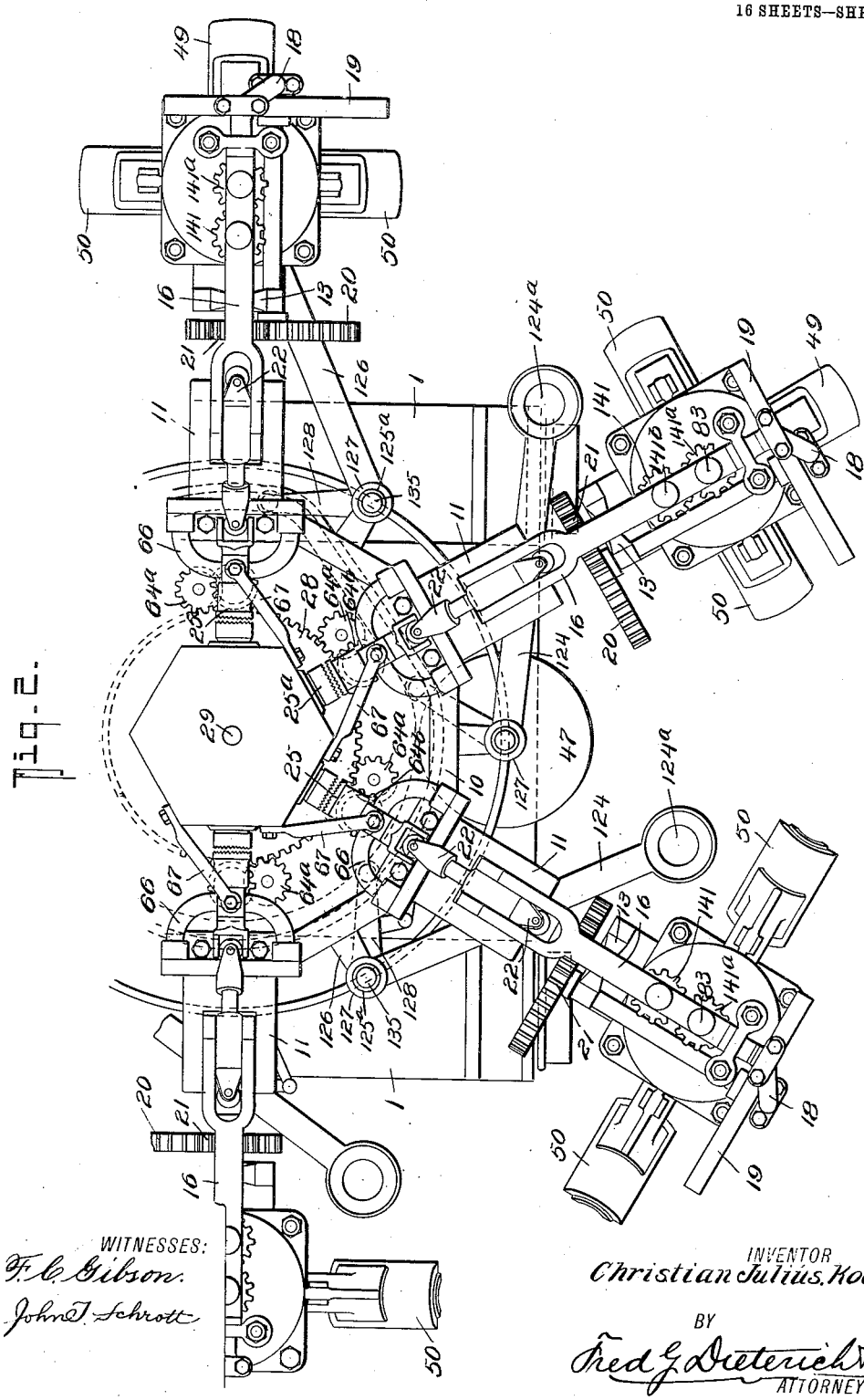
Figure 3:
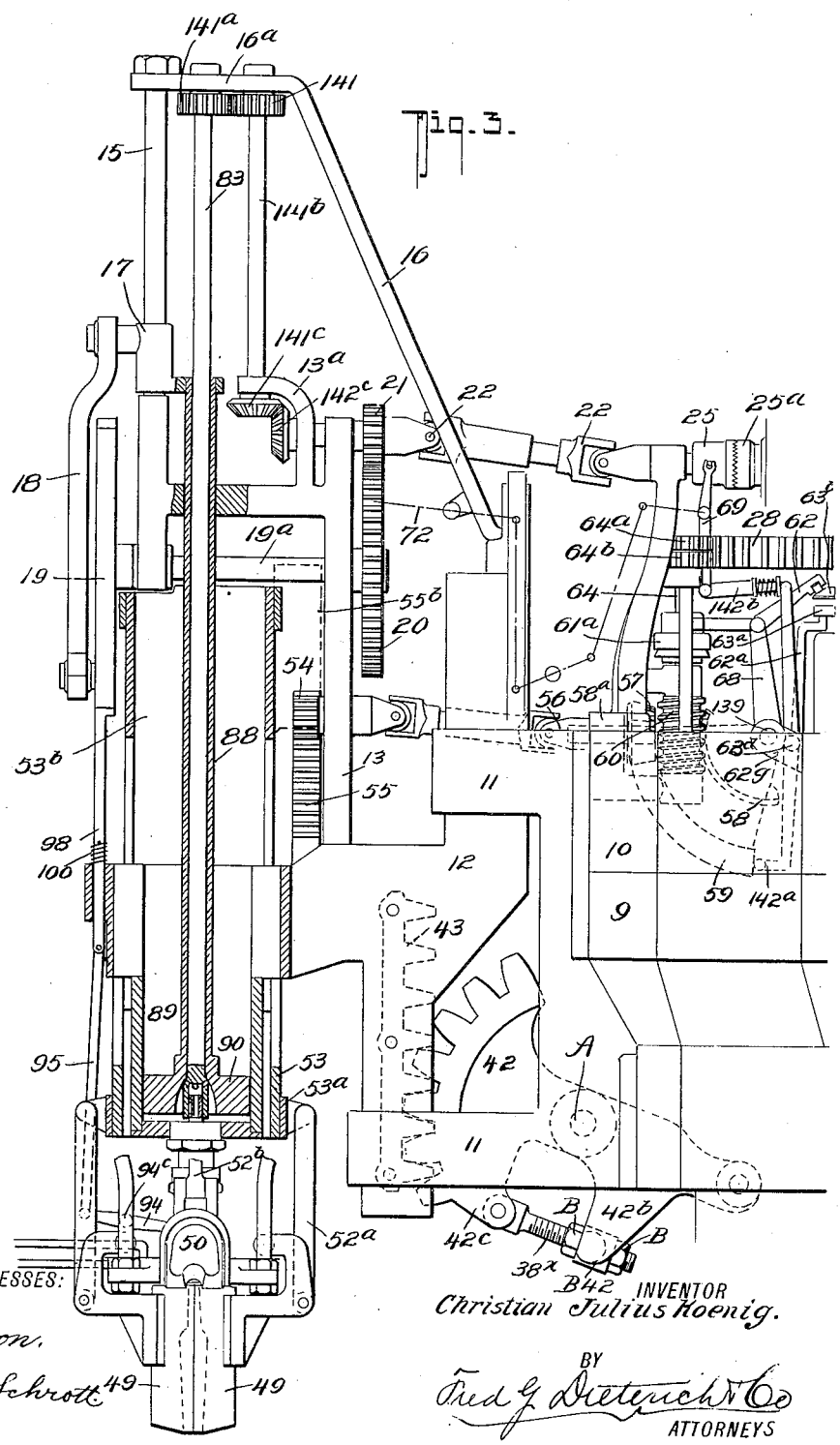
Figure 4:
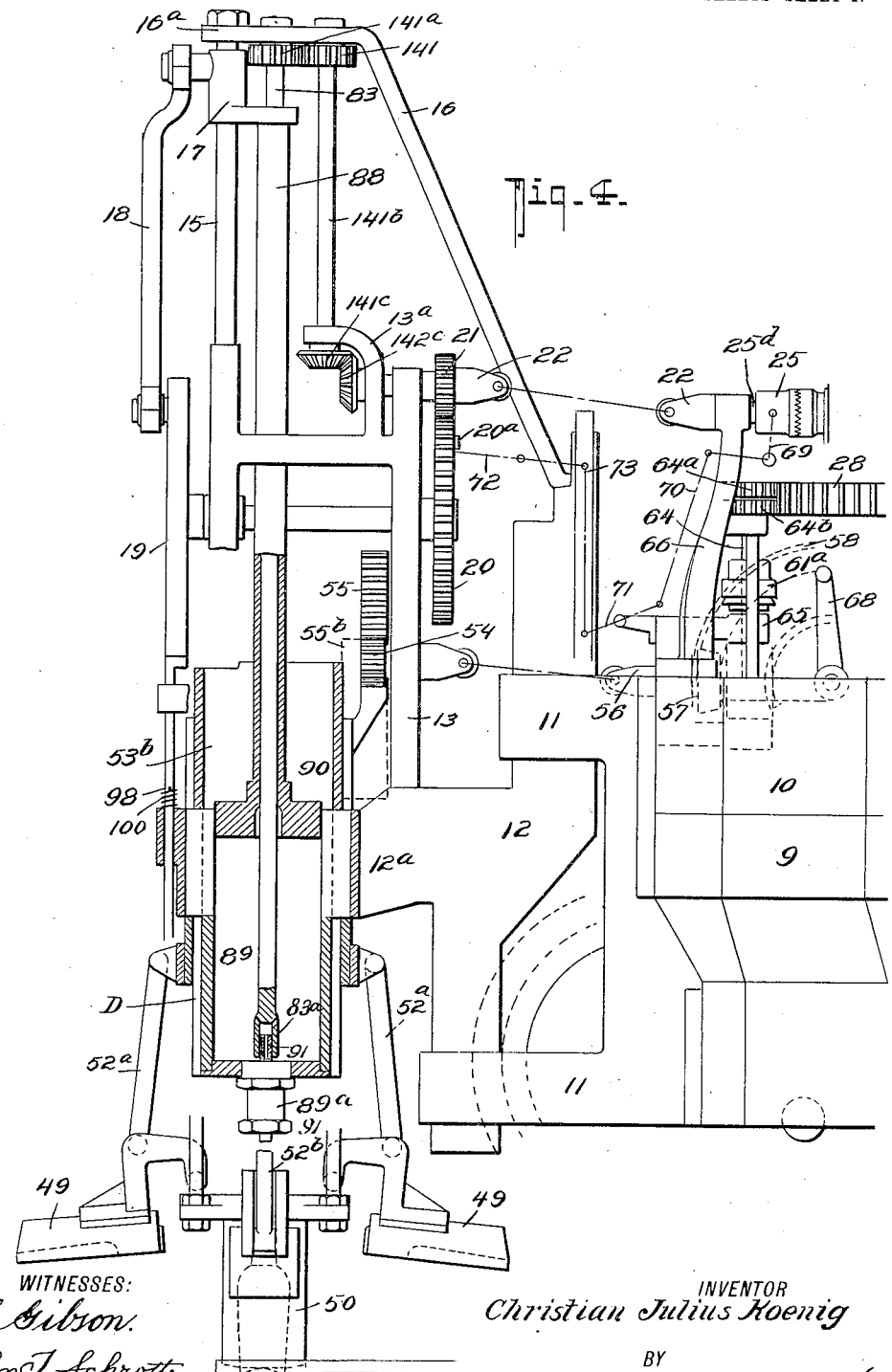
Figure 5:
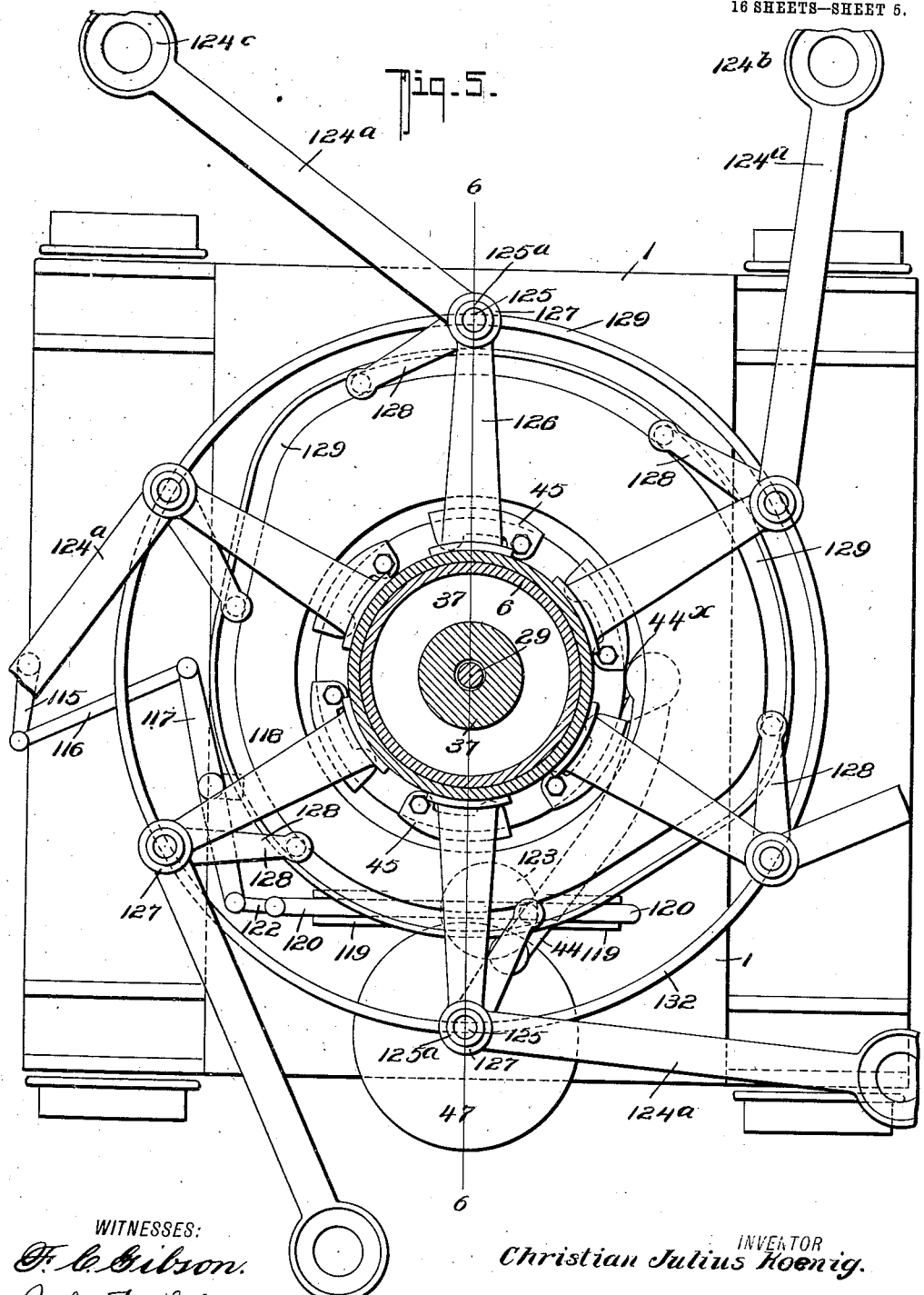
Figure 6:
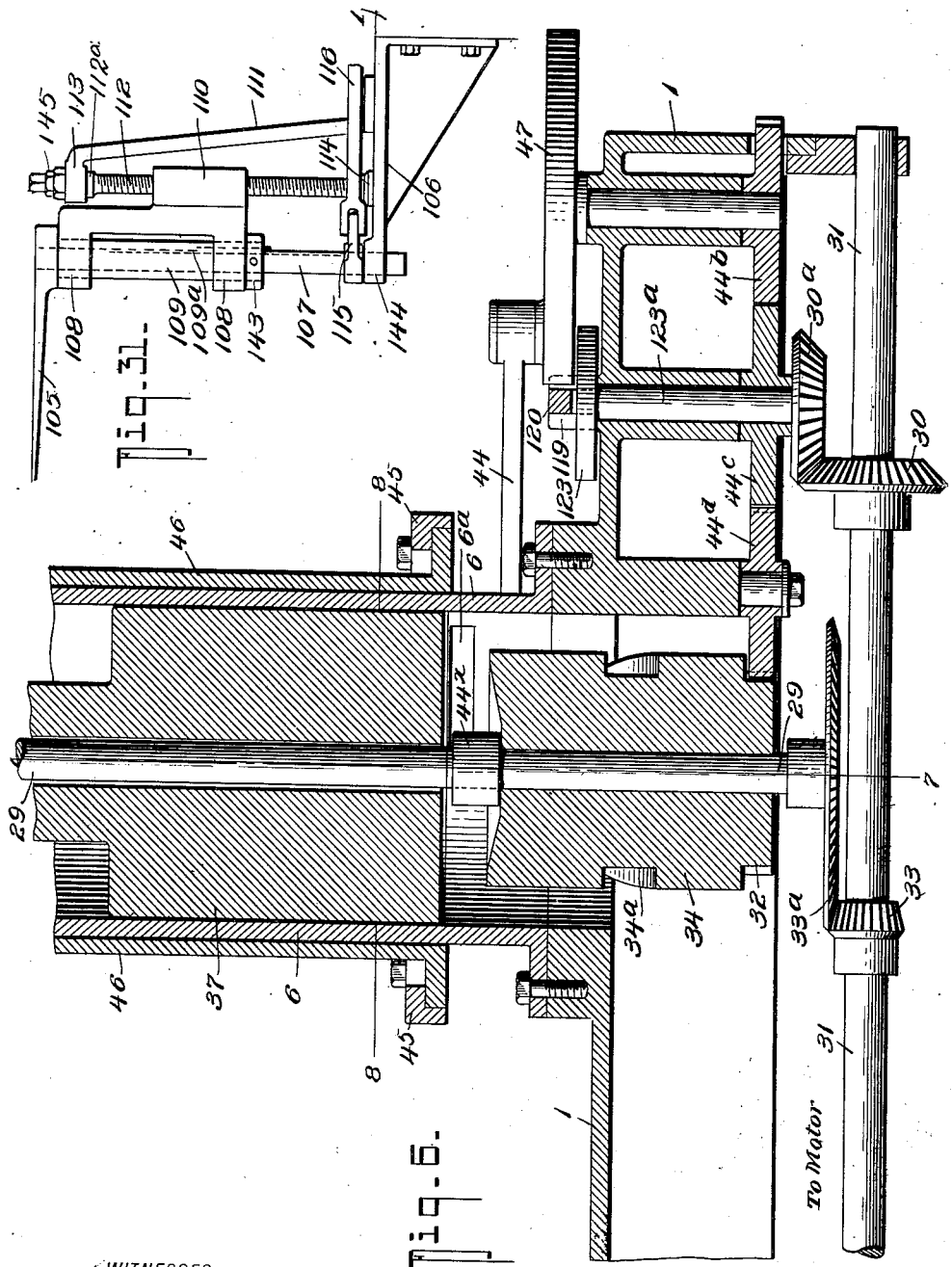
Figure 7:
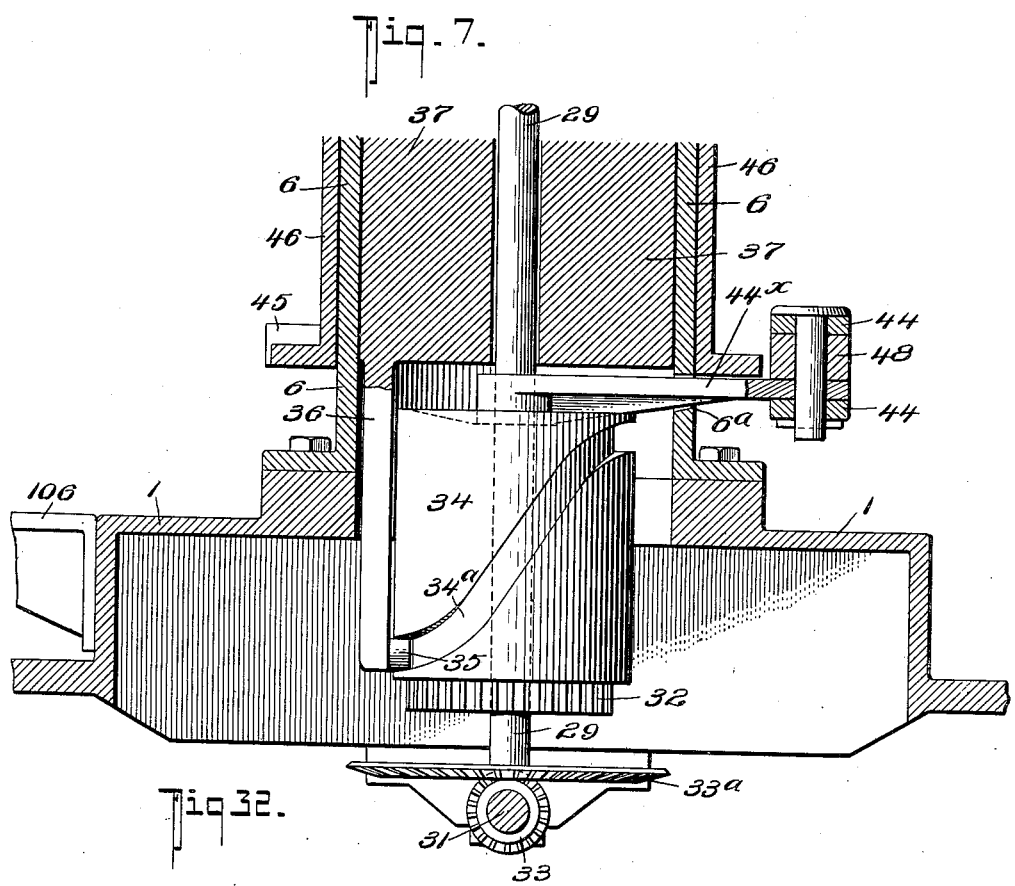
Figure 32:
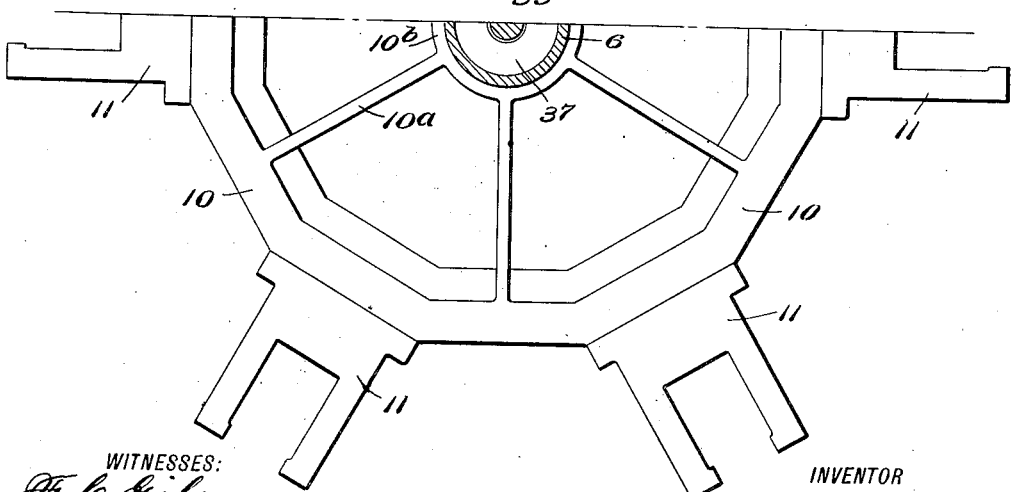

Figure 1, is a side elevation of my improved machine, with but two heads or complete sets of diametrically oppositely disposed and independently operating mechanisms shown, the intervening heads or independently operating mechanisms being omitted to the more clearly illustrate the detailed construction of the heads and their coöperative relation with the sustaining and actuating means. Fig. 2, is a top plan view which shows the correlative arrangement of six heads or independently acting mechanisms. Fig. 3 is a vertical section of one of the independent sets of mechanisms with some of the actuating means therefor, the parts being shown in position for effecting the fore or initial form to the drawn glass charge. Fig. 4, is a similar view which shows the parts positioned for applying the final form. Fig. 5, is a horizontal section on the line 5—5 on Fig. 1, showing the supporting or truck frame, the cam track-way and the rotatable carriage mounted on said frame. Fig. 6, is a vertical section on the line 6—6 on Fig. 5. Fig. 7, is a detail section taken on the line 7—7 on Fig. 6. Fig. 8, is a horizontal section on the line 8—8 on Fig. 6, and illustrating the ratchet device for actuating the rotary carrier and the knife operating device. Fig. 9, is a detail vertical section of the stationary column 9, the counterpoise 37 and the device for actuating the levers 42. Fig. 10, is a detail horizontal section on the line 10—10 on Fig. 9. Figs. 11, 12, 13 and 14, are detail views, hereinafter specifically referred to, of parts of the mechanism for moving the vacuum head or pump piston. Fig. 15, is a plan view of the neck ring, showing the same as adapted for charging and exhausting the molds for forming a single bottle. Fig. 16, is a transverse section on the line 16—16 on Fig. 15. Fig. 17, is a detail view of one of the neck ring clamp members hereinafter referred to. Fig. 18, is a plan view of the preferred form of neck ring showing the same adapted for forming a plurality of bottles at one operation. Fig. 19, is a cross section thereof on the line 19—19 on Fig. 18. Fig. 20, is a detail transverse section, taken on the line 20—20 on Fig. 18, and illustrating the manner in which the air channels for the several ducts to the several sets of forming molds are formed. Fig. 21, is a plan of the multiple neck ring with parts positioned at 90° from the position shown in Fig. 18. Fig. 22, is a similar detail view of the multiple neck ring in the mid position with the bottle neck clamp members separate. Fig. 23, is a vertical section on an enlarged scale, of the lower end of one of the independent mechanisms, illustrating the fore or initial formers as being lowered to the molten glass in the tank and as being charged. Fig. 24, is a similar view, showing the said mechanisms as elevated and the cut-off devices in position for severing the entrailing glass. Fig. 25, is a detail section showing the true or final form in position and the initially shaped article ready for the final blowing. Fig. 26, is a detail sectional view showing the pump piston at the final blowing, the neck of the article blown to its final shape. Figs. 27 and 28 are detail views of the stationary cams at the top column 6 hereinafter referred to. Fig. 29, is a detail vertical section of the upper end of the central column, the main drive mechanism, and the actuating devices for one head. Fig. 30, is a detail view of the posts 125—125ª and the latch devices 130—130ª hereinafter referred to. Fig. 31, is a side elevation of the glass severing knife mechanism. Fig. 32, is a plan view of one-half of the rotary carrier frame.

To render the detailed construction of my present machine the more readily understood, I shall first briefly outline the general arrangement and operation of the said machine and then describe the several coöperating and interdependently acting mechanisms in detail.

In the preferred construction, my present machine practically comprehends a main supporting base in the nature of a wheeled truck, a sustaining frame revolubly mounted on the truck, a plurality of independently actuating mechanisms, hereinafter termed "heads", each of which, per se, practically forms a machine for producing hollow glass ware, six of said heads being shown in the drawings, which are mounted for vertical reciprocation and adjustment upon and projected radially from the bearing column of the revolving frame, and each of the said heads, through suitable levers, gear and cam devices, is coöperatively joined with the actuating means that controls the movement of the revolving frame, and each of the said independently acting mechanisms is also provided with means for drawing and shaping a plurality (three being shown) of glass charges, whereby at a cycle of movement of each glass drawing and shaping mechanism, three complete articles of glass ware will be made, thus providing for the finishing of eighteen bottles at each complete rotation of the entire machine, it being manifest from the detailed description to follow, and the drawings, that my means for controlling the pneumatic devices may be readily modified to provide for producing a lesser or greater number of complete articles during each cycle of movement of each independent acting mechanism or head.

The machine is placed adjacent the glass tank, which has a suitable opening through which the glass may be drawn by the heads or independent mechanisms as they are successively brought into vertical alinement with the tank and are lowered, whereby their mold ends will dip through the tank opening and engage with the molten glass.

For imparting a vertical motion to the heads, a suitable cam track is provided on the truck frame, with which the supports for the heads that are slidably mounted in guides on the rotary frame engage at predetermined times.

Prior to causing the heads to move to their "dipping" position, lever and cam devices provide for closing the fore or initial molds and the neck ring, and when the heads are "dipped" a pump mechanism mounted in alinement with the vertical axis of the molds creates a partial vacuum and serves to draw in or fill a charge into the forming mold and neck ring and as soon as the said fore mold is filled, timed devices act to cut off or separate the entrailing glass from the mold and at the same time form the bottom for the mold.

The head as it is carried forward, has its fore or initial formed molds automatically opened while the neck ring still grips the head of the article being formed and then the said head has its true or final formed molds automatically closed around the initially formed glass mass, after which the means that created the partial vacuum for drawing in the charge acts upon the air in the vacuum chamber and immediately forces said air back under pressure into the several initially formed glass articles to expand the said initially formed articles to fill the true form mold sections, after which the finishing or true form molds are opened, as is also the neck ring, and the completed ware is removed.

Referring now more particularly to the details of construction, each "head" is provided with two sets of sectional molds, hereinafter known as the fore or initial form, which has for its purpose to receive and measure the amount of glass to be used to give the said glass the initial or primary shape, and the true or finished form which has such internal shape that when closed around the initially formed glass and the said glass is blown, the latter is forced under air pressure against the inner surface of the said true form and the exact shape is thereby imparted to the glass, it being understood that the time the glass is inclosed by the fore form, it is sufficient to provide for the required chilling of the outer portion of the glass form or blank to produce a hardened skin that will temporarily hold the said initial shape of the glass mass as it passes forward to be inclosed by the finishing or true form.

By referring now more particularly to Fig. 1, the "head" at the left is shown in the position it occupies when the entrailing glass is cut off, with the fore form or opposing mold sections 49—49 closed and the true form molds 50—50 open.

*Order of movement.*—In its complete operation, my machine has substantially a number of distinct movements in proper order, which briefly stated, are as follows:—First: Fore form dips and descends to surface of molten glass in the tank. Second: The charge of glass is drawn into the fore form. Third: The fore form rises from the glass. Fourth: The entrailing glass is cut off after which the fore form opens. Fifth: The true form closes around the initially formed glass article. Sixth: The bottom is raised. Seventh: The initially formed glass body is blown by forcing the air in the vacuum chamber into the said body. Eighth: Bottom of true form is lowered. Ninth: True form is opened half way and fore form is closed half way. Tenth: Bottom for true form is elevated to finish product. Eleventh: Neck ring opens. Twelfth: Bottom with finished product lowers and swings from under the true form. Thirteenth: Fore form again closes and stated operations are repeated.

1 designates a stationary base, to which is bolted an iron shell 6 which serves as a single column around which the machine is built and at the upper end the column has two cams $63^a$—$63^b$ which exclusively control the movements of the fore-form and the true form devices in a manner presently explained.

37 designates a counterweight which is raised and lowered at each revolution of a drum 34 which has a cam slot $34^a$, with which engages a roller 35, mounted on the lower end of an arm secured to and forming a part of the counter-weight 37. The drum 34 is rotated by means of a beveled gear $33^a$ mounted on a central shaft 29, that extends up through a central aperture in the counter-weight 37 and the bevel gear $33^a$ meshes with a drive gear 33 on a main shaft 31, journaled in bearings on the bottom of the base frame 1, and which, in practice, is driven by an electric motor, not shown, which may be carried on the machine.

7 designates a collar bolted to the column 6 and thereby held stationary. On one side, the said collar has a cutaway-segment 38, see Fig. 9, which segment is joined through a slot $38^a$, with the counter-weight 37 whereby the said segment 38 will be caused to move vertically with the said counter-weight 37.

The upper part 10 of the rotary frame is polygonal in horizontal plan and is provided with ribs $10^a$ that extend radially toward the center to a sleeve $10^b$, upon a roller bearing 8, and carrying guides 11 for the head.

Suspended from the part 10 are hollow castings 9 and 46, the latter casting being guided by the part 6 in its rotation as it is revolved by means of the ratchet teeth 45 upon the flange at its base, as clearly shown by Fig. 8.

The ratchet teeth 45 are propelled by ratchet pawl $44^a$ on an arm 44 that is driven by means of a crank disk 47, which in turn is driven by a train of gears $44^b$, $44^c$, $44^d$, that engage a spur gear 32 on the bottom of the drum 34, as clearly shown in Fig. 6. As the said teeth 45 are driven, they impart rotation to the casting 46 and in consequence thereof, rotate the frame 10 and frame 9, which frame members directly support the several heads hereinafter explained. The arm 44 is held toward the rotary member 46 by the radial arm $44^a$ on shaft 29 that projects through slot $6^a$ in column 6, see Fig. 6. Each of the "heads" hereinafter described in detail, includes a supporting arm 12, see Fig. 3, that moves vertically through the guides 11, as will be presently more fully explained.

Each set of mechanisms includes a shoe 39, see Figs. 9 and 10, having a tongue $39^a$ on its upper face which engages a slot 40 in the member 7, as clearly shown in Fig. 9, and 42 designates a segment of a spur gear. $42^b$ denotes an arm which carries a roller 135 at its inner end that engages with the shoe 39 and one end of the spur gear $42^a$, and the arm $42^b$ are fulcrumed on the casting 11, as indicated at A, and the two parts are joined to form, as it were, radial levers through the medium of an adjusting screw $38^x$, which screw has one end pivotally connected with a flange $42^c$ on the segment 42 and its other end passed through a box $B^{42}$ on the member $42^b$, to which box $B^{42}$ it is adjustably connected by the nuts B—B, as shown, and by reason of the manner of connecting the two parts $42^b$ and 42, means is provided to meet the conditions caused by changing the size of the ware and the elevation of the glass in the tank.

Each of the "heads" includes a rack 43 made fast to the supporting arm or member 12 and which is held to engage with the segment 42, which by its oscillatory movement, moves the said arm 12 vertically, which arm carries with it the glass drawing and shaping means hereinafter described in detail.

As before stated, in the complete machine, as shown, 6 castings or guides 11 that radiate from the frame 10 and the said frame with the arms and devices carried thereby, is rotated, as stated, by means of the ratchets 40 and teeth 45 on the base frame member 46, and by reason of such construction of parts and the manner of applying motion thereto during each revolution of the "heads" about the axis of the machine, each "head" completes its cycle of movement for producing a plurality of or a single article, and each succeeding "head" or machine is a stage behind its predecessor, so that practically a continuous operation of drawing and shaping the glass and moving it to a point of discharge, is effected.

To further render the construction of parts clear, I shall now proceed to describe the first movement of the machine and point out the details of construction and their cooperation.

*First movemnt.*—Fore form is lowered to take glass. Referring again to the left side of Fig. 1, it will be noticed the fore form, which includes the two sections 49—49 is closed. To lower the said fore form into the molten glass in the tank, the entire "head" is caused to descend, which movement is effected by revolving drum 34, having the cam-way, with which engages the roller 35 on member 36 that forms part of the counterpoise frame 7 which carries the shoe controller 38 when the shoe has moved under the said controller, see Fig. 7. Due to the now upward movement of the controller 38, the shoe 39 and the rollers 135, see Fig. 9, the toothed end of the segment $42^a$ swings downward and carries with it the rack 43, and in consequence, the arm 12 and fore form supported by the said arm descends toward the tank. As the main frame revolves about the axis of the machine, crank levers 62, see Fig. 9, fulcrumed on vertically projected brackets 68 are actuated, by reason of their upper ends (which have roller bearings $62^c$) engaging the stationary cam $63^b$ and levers $62^a$ are also actuated, said levers $62^a$ being fulcrumed about midway their length, as at $62^d$, their upper ends being bent radially inward and each terminating in an upturned friction or guide portion that engages a stationary cam $63^a$, which together with cam $63^b$ shown in detail in Fig. 27, is fixedly joined with the column 6.

59 designates a segmental spur gear that is concentric with and rigidly connected to a segmental bevel gear 58, fulcrumed at 139 on the bracket $62^g$.

28 designates a master drive spur gear mounted on the central shaft 29 near its upper end, which meshes with the entire series of two gears $64^a$—$64^b$, one of which, $64^a$, is mounted on the upper end of a vertical shaft 64 journaled in bearings 65 on the framing that carries a worm gear 60 that meshes with the segmental gear 59, and on the said shaft 64 are also mounted two shiftable clutches $61^a$ and $61^b$, operated by the spur gear $64^a$ on the same shaft 64, but the clutch $61^a$ rotates in a direction reverse to clutch $61^b$ by reason of two spur gears 140 being interposed between clutch $61^a$ and its propelling gear $64^a$.

57 designates a bevel gear that meshes with the bevel gear 58 and is suitably mounted in a bearing $58^a$. This gear 57 has a universal joint connection 56 that couples it with a spur gear 54 that meshes, at one side with a rack 55, which is fixedly joined with and forms a part of cylinder 53, which latter carries at its lower end a support $53^a$ for the arms $52^a$ that operate the fore form sections 49—49.

$55^b$ is another rack that opposes rack 55, which also engages gear 54 and this rack connects with and controls the movement of cylinder 53$^b$ that actuates rods 52$^b$ that control the opening and closing of the true form sections 50—50.

Referring now more particularly to Figs. 3 and 4, which disclose the glass drawing and blowing means, 89 designates a vacuum cylinder secured to the lateral extension 12$^a$ of the frame 12, which extension passes through the elongated slots D—D in the opposite walls of the cylinders 53$^a$ and 53$^b$ respectively.

As clearly shown in Fig. 3, part 53 designates a headless cylinder which slides on the guide portion 12$^a$ of frame 12, and is operated by the rack 55 that supports the said cylinder and meshes with gear 54, which gear meshing with rack 55 imparts reciprocal movement thereto. The cylinder 53$^b$ is the one that carries the true form devices, hereinafter again referred to.

By reason of the opposing racks supporting the two cylinders 53 and 53$^b$ and actuated by the single gear 54, it is obvious that as gear 54 rotates, one of said cylinders rises as the other descends, such operation serving to open one of the glass formers as the other former or shaping means closes.

The fore-form members 49—49 and the true form members 50—50 are suspended by the arms 52$^a$ and 52$^b$ respectively, from the plate bearing the neck ring hereinafter fully described and said arms are raised and lowered by the rise and fall of the members 53$^a$—53$^b$, hereinafter referred to.

In Fig. 29, 26 represents bevel gears, of which there is one for each "head" or complete set of mechanisms, and each has for its purpose to drive a clutch 25, and the several gears 26 receive power and are driven by meshing with the master bevel gear 27 mounted on the upper end of shaft 29. The shafts 25$^d$ that carry the gears 26 and clutches 25 are journaled in bearings formed on the upper ends of the arms 66 and the radial extensions 67 that support the top housing, as shown.

Each "head" includes a crank disk 19 having peripheral cams, see Figs. 4 and 13 mounted on the shaft 19$^a$ and journaled in the standards 13 and 14 and carrying at the end opposite the disk 19 a large spur gear 20 that meshes with and receives power from a smaller gear 21, journaled in the upper end of standard 13, and the supplemental standards 13$^a$, and which receives motion from the gear 26 through the medium of the universal joint connection 22.

During operation of crank disk, the pitman 18 is oscillated, which vertically reciprocates cross head 17 slidably mounted on guide post 15 and the rotary shaft 83.

The rotary shaft 83 carries a spur gear 141$^a$ driven by gear 141 on a short vertical shaft 141$^b$, journaled in the frame portions 16 and 16$^a$ that receive motion from the shaft connected with the universal joint 22, through the bevel gears 141$^c$—142$^c$.

The lower end of the shaft 83 see Fig. 26, is formed with a vertical socket 83$^a$ for receiving the upper end of the vacuum head 91, which has a limited sliding movement, vertically, in the socket 83$^a$, but rotates with the shaft 83, it having a groove 92 that engages the key 92$^a$, as shown.

The head 91 has its shaft portion projected through a gland 89$^a$ on the bottom of a stationary and inner cylinder 89, presently again referred to, and by reason of such connection, the vacuum head may be vertically reciprocated as it is rotated, by means of a lever 94 having a stud 94$^a$ for engaging the groove 91$^b$ in the head, as clearly shown in Fig. 26, by reference to which and Fig. 3 it will also be noticed, the lever 94 is fulcrumed in a bearing 94$^c$ and has its outer end pivoted to a link member 95, pivotally joined to the lower end of a spring returned rod 98, vertically slidable in a bearing with the outer end of frame 12$^a$ and held with its upper end normally in engagement with the periphery of the crank disk 19 having the cams 99, which, at predetermined intervals, engage and depress the rod 98 and thereby actuate the lever 94 to lift the vacuum head for creating a vacuum as the head is rotated, the spring 100 returning the parts 96, 95, 94 and 91 to their normal position. To provide against the glass being driven through the air ducts 91 of the head, the lower end of the said ducts terminates in lateral branches d—d that open through the sides of the head instead of at the bottom.

As before stated, the cross head 17 moving on guide 15, carries the hollow piston rod 88 that has the piston head 90 which reciprocates in the stationary cylinder 89, held fast by arms fastened to the frame 12.

*Second movement.*—Drawing glass into fore form: During the first movement of the machine, the fore form is lowered into the glass in tank T, through the medium of the mechanism controlled by the cam drum 34. The position of the fore form remains constant during the operation of filling the fore-form or initial shaping means, which is best explained as follows: When the segmental gear 58 completes its first movement, that is, reaches the position shown at the left in Fig. 1, its lower end engages the heel 142$^a$ see Fig. 29, of a long lever 142 fulcrumed on the stud 63$^d$, and which, at the upper end, has a pivotal and yieldable link connection 142$^b$ with the lower end of a bell crank lever 69 and through such connection it throws a clutch 25 in engagement with a clutch member 25$^a$ rotatable with the shaft carrying gear 26, which then sets in motion the universal joints 22 and the several rotatable and movable parts controlled thereby. During the operation of rotating the shaft 83, the rotary vacuum head 91 is firmly held against the neck ring, presently referred to, by the action of spring 100 on rod 98 and lever 94. Now, as the crank disk 19 is turned, the first upward motion is imparted to cross head 17 and during this movement, hollow piston rod 88 with its head 90 is drawn up, which forms a partial vacuum in the lower part of the cylinder 89, as also in the fore-form, through the air duct 93, and due to the reduced pressure now within the fore-form, molten glass is drawn up into and fills the said fore form by the atmospheric pressure on the molten glass in the tank.

The operation of sucking up and filling the fore form with glass is discontinued, when the stop 20$^a$ on the gear 20 engages and trips a lever 72 (see Fig. 11) which lever engages a slotted slide bar 73 mounted on the head casting 12, the now up movement of which imparts a tilt to another lever 71, joined by the link 70 to the bell crank 69 and causes the said crank to shift the rotary clutch member 25$^a$ out of engagement with its mate 25.

To provide for the desired movement of the levers 71 70 and 69, whereby to insure the shifting of clutch 25$^a$ at proper times, the lever 72 is adjustably joined with the sliding member 73 by a block 75 mounted on a screw 76, mounted in the frame 73, and to avoid jars in releasing the clutch 25$^a$, the lever 71 joins with a block 71$^a$ on the frame 73, mounted in a slot between opposing buffer springs 79—79, as shown in Fig. 11.

The action of stop 20$^a$ on gear 20 replaces lever 142$^b$ to its original position, and it should be stated, when stop 20$^a$ contacts with lever 72, the crank pin on disk 19 is at its highest position and when piston 90 has completed its upstroke.

Since sometimes the entire up stroke of piston 90 is not required to fill the fore form, the excess or final up stroke might, under some conditions, tend to force glass into the vacuum head. Means are therefore provided for preventing this, which means operate at the time the glass has filled the fore form, and in the following manner: When lug 99$^a$ (see Fig. 13) on disk 19 has moved rod 98 down as previously stated, and lifted the nose of the vacuum head out of the glass in the fore form, air rushes in and fills the cylinder 89. This having occurred, no further vacuum is needed for the production of the finished product, but for supplemental functions the disk 19 is further moved a half revolution and consequently piston 90 is caused to travel to its highest point without further effect upon the glass in the fore form, which has been filled by the partial vacuum created within the cylinder 89.

By referring now more particularly to Figs. 11, 12 and 13, it will be seen that on the guide 97 for rod 98, is a bracket bearing 96$^a$ in which is rotatably journaled a pin 96$^b$ having an inwardly bent lug 96$^c$ that extends toward the face of the disk 19 and normally projects in the path of movement of a lug 145 on the face of the said disk 19, which, at predetermined times, engages the lug 96$^c$, rocks the pin 96$^b$ and moves the dog 96$^d$ on the lower end of pin 96$^b$ out of the notch 98$^a$ in the upper end of rod 98, and thereby leaves the rod 98 free to be pressed down at the proper time for actuating the head 91, the pin 96$^b$ being normally swung to the position shown in Fig. 14.

As before described, disk 19 is now at rest and it so remains until the time for blowing the initially shaped glass mass now in the fore form, which operation in my machine is done by the piston 90 previously used for creating the partial vacuum, which, on its return stroke compresses the air contained within the vacuum chamber.

As disk 19 again begins to return for effecting the blowing stroke of piston 90, a second lug 145$^b$ on disk 19 contacts with the pin that carries the dog 96$^d$ and throws the said dog clear of the rod 98 and allows said rod to be thrown up by the spring 100, which automatically forces the nose with the air duct into the glass, and now leads the air now forced from the vacuum chamber, through the ducts 93, into the true form or final shaping devices, as the piston 90 descends.

As in the vacuum stroke of piston 90, the entire return stroke of piston may not be required for blowing sufficiently to force the glass out against the walls of the true form or final shaping devices, and to provide for relieving the vacuum chamber of air in excess of what is required during the final down thrust of the piston, the lug 99$^b$ on the disk moves arm 98 which automatically raises the nose of the duct from the glass, as before, to which position it is held by the dog 96$^d$ which again automatically engages with and locks the arm 98 to its depressed position, and until the said dog is again tripped up by the lug 145$^a$, when the nose of the air duct head 91 is again lowered into the fore form for drawing in glass for the next article. Lugs 145$^a$—145$^b$ are stationary and located on the disk 19, diametrically opposite each other, while the disks 99$^a$—99$^b$ are adjustably mounted on the perimeter of disk 19 (see Fig. 13) to regulate the amount of up and down stroke of the piston to be used.

*Third movement.*—Raising the fore form out of the glass: The fore form is raised out of the glass by elevating the entire "head" in a manner similar to that of lowering it, as described for the first movement, which is effected by the mechanism actuated by the cam drum 34, which, during one revolution, effects the complete lowering and raising of the entire "head."

Referring now to Fig. 31, 109 designates a vertically mounted tubular shaft which carries at the upper end a horizontally projected knife blade 105, and the said shaft 109 is held to rotate in the bearings 108 and from lifting out of the bearings by a collar 143 secured to a second shaft 107 mounted in the shaft 109, having a longitudinal key-way that engages the key 109ª on shaft 109, which causes the two shafts to revolve together. The lower end of shaft 107 is mounted in a bearing 144 in the bracket 106 bolted to the stationary base of the machine. A lever 115 connects on the shaft 107 through a hinged joint, with an arm 116, see Fig. 31, the purpose of which will presently appear.

In bearing 113 formed in the bracket or base member 111, mounted on the member 106, see Fig. 31, is rotatably held the upper end of an adjusting screw 112, the lower end of which is rotatably held in a socket head 114 on the supporting member 106, and on the said screw (which is held from rising by the collar 112ª) is mounted a screw capped cross head 110 formed integral with the bracket 108. The upper end of screw 112 is squared to receive a wrench and has lock nuts 145, as shown.

Referring now more particularly to Figs. 1, 5 and 8, it will be seen that the member 116 is hinged to one end of a lever 117, pivotally secured to the base frame at 118. A link 122 connects with the other end of the lever 117 and joins the said lever to a sliding bar 120 to which a reciprocating movement is imparted by an eccentric 123 on shaft 123ª, see Figs. 5, 6 and 8, the said bar 120 sliding in guides 119, as best shown in Figs. 5 and 8, from which it will also be noticed that the mechanism for actuating levers 116 and 117 does not revolve it will also be noted that the mechanism for actuating levers 116 and 117 does not revolve about the main axis of the machine, but is held stationary on the machine base.

*Fourth movement.*—Cutting off entrailing glass: The devices shown in detail in Fig. 31 are provided for cutting off the entrailing or surplus glass from the fore form as it lifts out of the tank, and the said devices are operated at predetermined times at each cycle of movement of each of the "heads" by a cam 123 on the shaft 123ª, as stated, which is so arranged whereby to actuate the sliding bar 120 which imparts motion to the knife 105 through the medium of the links 122, 116, 115, 107 and 109, as hereinbefore described, the correlation of the parts being such, to effect the swinging of the blade 105 about the center of shaft 107, and under the fore form 49 in contact with the lower edge thereof, which shears off the entrailing glass.

The cam 123 holds the knife 105 in the latter position until the next motion is complete, which then swings back to allow clearance for the lowering of the succeeding head into the glass.

*Fifth movement.*—Replacing of the fore form by the true form, or final shaping devices: Referring now more particularly to Figs. 3, 4 and 29 after the entrailing glass has been cut away, the glass within the fore form, which is the exact amount needed for making the article, and which has, by reason of its filling the fore form, been given an initial shape, is subjected to a final shaping by the action of the true form devices, the operation of which is explained as follows: At the proper time, cam 63ª moves clutch 61ᵇ into an operative position for effecting the rotation of worm 60, which causes the segmental gear 59, together with the segmental bevel gear 58, to swing upwardly on their fulcrum 139, which transmits motion to the bevel gear 57 and spur gear 54, the latter causing rack 55 to move upward and rack 55ᵇ to move downward, and since the racks 55 and 55ᵇ are connected to the cylinder 53ª and 55ᵇ respectively, they now operate to open the fore form members 49, through arms 52ª, and simultaneously, through arms 52ᵇ, to close the true form members 50—50. At this point, it should be stated, during the said movement of the true form and the fore form devices, the molten mass of glass is sustained at the upper end by the neck ring devices to be described.

As will be readily noticed from Fig. 1, the fore-form and true form devices are swung from a circular head plate, and this plate carries the neck ring devices presently referred to, the members 49—49 and 50—50 being disposed at right angles to each other as best seen at the right of Fig. 1, where the two forms are shown in their mid-position. Thus, as the cylinder 53 is raised by its gear 54 and rack 55, the fore form members 49—49 open, while at the same time the downward movement of cylinder 53ᵇ from the rack 55ᵇ and gear 54, closes the true form members 50—50, the movement of the two forms being such that they do not interfere in their travel.

Referring now more particularly to Figs. 1 and 5, 132 designates a circular track with which engage guide traveler wheels 131 on the shanks or posts 125, that are rotatably and vertically movable in hollow shafts 125ª, rotatably and vertically movable in the bearings 127 on the yoke frames 126 that project radially from and are secured to the member 46 of the main frame, and 128 designate arms connected to the hollow shafts 125ª by hub portions 128ª which have a sliding key joint. The said arms 128 impart a rotary motion to the hollow shafts 125ª at predetermined times, through the medium of a horizontal fixedly held cam 129, mounted in short posts 133 that rest on the stationary base of the machine. Arms 128 are held from dropping by the fingers 130 bolted to bearings 127 and which work in horizontal slots 130ª in the apertured heads of the said arm, as best shown by Fig. 30. Track 132 has depressions 132ª and elevations 132ᵇ for raising and lowering the posts 125, the hollow shafts 125ª and arms 124ª, which latter have horizontal extensions 124ᵇ that form the bottoms of the true forms and which sustains the finished article. Posts or shanks 125, it should be stated, never rotate with respect to the bearings 127, they being held from such movement by the groove of wheel 131 on the track 132.

*Sixth movement.*—Raising the bottom for the true form: When the true form members 50—50 are closed about the glass initially shaped by the fore form, cam 123 again actuates the sliding bar 120, operates knife blade as before, but swings it from under the now closed true members 50—50, and this movement occurs while the machine revolves about its axis and when the arm portion 124ᵇ is directly under the true form, when the elevation on the track 132 raises the wheel 131 and the shafts 125—125ª and elevates the arm portion 124ᵇ firmly against the true form. The arm member 124ᵇ is formed with a seat 124ᶜ having inclined edges whereby to wedge against and clamp the lower ends of the members 50—50 together, as clearly shown in Fig. 25 and at the right of Fig. 1. The track 132 being level during the space covered by the next movement to be described, the base or closure member 124ᵇ is firmly held up and closes the bottom of the true form, and the next movement closely follows that of closing the true form, in fact, just before the true form closes, knife 105 is moved from under it and the member 124—124ª is closed up against the true form.

*Seventh movement.*—Blowing the article: Segmental gear 58 having been returned to its lowermost position swings lever 142 so it moves bell crank lever 69 to shift the shaft clutch to engage the gear clutch 25 which effects rotation of shaft 83. The piston 90 is now at its uppermost position, while the nose of the vacuum head 91 is now being lowered into the neck ring, (presently described) in position for the blowing operation, which is done as the piston descends to force out the air now contained in the vacuum chamber and which as before stated, is forced through duct 93 in the nose of the duct head 91 until the article is blown. If the entire down stroke of the piston is not required to draw the necessary quantity of air, the nose of the duct head 91 is again raised out of the neck ring when the article is blown by the mechanisms hereinafter explained and illustrated in detail by Figs. 12, 13 and 14. It should be stated, however, that the piston 90 moves to its lowest position when cam 20ª on gear 20 disengages clutch 25, through the medium of lever 72, the same as at the end of the vacuum stroke. At this point in the operation of the machine, the article is completed and needs only to be taken from the true form.

*Eighth movement.*—Bottom drops: Referring now to Figs. 1 and 5, before the true form is opened to release the blown article, the base member 124ª and 124ᶜ must be lowered so as to disengage the lower or flanged edges of the true form members 50—50. As the said base 124 was raised by the elevation in the track 132, it is now lowered by the depression in the same track so that the upper surface of the member 124ᶜ will clear the lowest line of the true-form mechanisms as the latter swing out during the succeeding movement. Due to the peculiar shape of the cam 129, see Fig. 5, the base 124 is held so that a vertical line through the center of it passes through the center of the neck ring.

*Ninth movement.*—True form opens half way and fore form closes half way: The cam 63ᵇ now operates the lever 62ᵇ which then engages clutch 61ª, rotates the worm 60, see Fig. 29, in a direction opposite to that previously effected and drives the segmental gear 59, counter clockwise, which carries with it the segmental bevel gear 58, and by reason of the movement of such parts, the rack 55 is now driven down and the rack 55ᵇ is elevated through the medium of the several cylinders and links heretofore explained. The movement of the cylinder 53ᵇ now opens the members 52ᵇ and member 53ª to close members 52ª and to stop the movement of the said parts when the forms are in their mid-position, as shown on the right of Fig. 1, and this position of the form is thus stopped at this point, because in this position, maximum clearance is given to permit of lowering of the arm 124 and to swing the said article through the opening between the form segments or sections 49 and 50.

*Tenth movement.*—Bottom rises: As the forms 49 and 50 assume their mid-position, the elevation of the track 132 raises the base 124 to receive the article so that it can swing the same through the openings between the forms 49 and 50, as above stated.

By referring now to Figs. 18, 19, 20, 21 and 22, which show the preferred construction of one of the essential features of my invention, the vacuum head, it will be noticed that the said head is provided for blowing a plurality of bottles, three forms being shown for forming three bottles or articles at one time, it being understood however, that the same arrangement of parts may be provided for forming a lesser or greater number of bottles or articles, and for example, they may be arranged for making but a single bottle or article, as shown in Figs. 15 and 16.

In the simplest form, as shown in Figs. 15 and 16, the vacuum head 91 has a nose or distributing member L at the lower end and the said head 91 terminates in an annular enlargement having tapering edges for engaging the tapering socket in a plate B, slidable on a casting D which is supported by four rods H that engage suitable apertures in the plate B and are made fast by the nuts, as shown. The plate B is formed of two sections, the meeting edges of which are formed to produce the desired neck and head shape to the bottle or article to be made, and each of the plates B has a pin K that projects upwardly therefrom and, as shown in Fig. 15, the casting D has an elongated slot $d$ in which the mold or former portion of the plate B works, and elongated recesses $d'$ in which the side extensions of the plates B move.

A disk E is held in a suitable depression in the casting D by means of clamp flange F, secured to the casting D by screws G and in the said disk E are cam slots M, one to each side of the axis of the head and eccentrically thereof, in which operate the pins K of the neck ring members B, the disk E being rotatably held, whereby to release or secure the neck of the article designated C on Fig. 16, as the said disk E is oscillated.

S designates an arm which is made fast to disk E and projects radially therefrom, and T is a hand lever pivoted to the frame member R and which communicates with the disk E by a pin $o$ which works in the slot N, as clearly shown in Fig. 15.

*Eleventh movement.*—Opening neck ring: When the base or arm 124 has been lifted to the bottom of the finished article as described in the tenth movement, the neck of the said article must be released. For this purpose a stop X independent of the machine is placed so that the arm S, see Fig. 15, when moving, will strike the said stop X whereby to give it motion in the direction indicated by the arrow on Fig. 15, and when thus moved, the arm S carries with it the disk E which has cam slots M, and by engaging the pins K, the two halves of the neck ring B will now be spread and the finished article permitted to drop on the base or supporting arm 124. The relation of the arm S and stop X is such that when the operation of opening the neck ring is completed, the said arm will have been turned sufficiently to pass the stop X. The neck ring is closed by proper movement of the lever T, see Fig. 15.

*Twelfth movement.*—Base lowers and article swings clear of forming devices: Since the depression in the track 132 provided for lowering the member 124 in the manner before described, when the neck or the finished article is dropped below the neck ring, the arm 128, actuated by the cam 129, causes the said base or arm to swing in the manner previously explained, which then moves the article laterally between the formed sections 49 and 50, as they now stand in their mid-position, as indicated on the right of Fig. 1 after which the finished article can be taken from the arm member 124ª by any suitable means and sent to the annealing oven.

*Thirteenth movement.*—Fore form closes: As one finished article has been taken from the true form and the said form is half way open and the fore form half way closed, the closing of the latter must be completed to permit of drawing the glass into it for the production of the next article or articles. For this purpose, cam 63ª now throws in clutch 61ᵇ and completes the arrested or mid-position motion set out in the ninth movement, the said mid-position movement having been stopped when the segmental bevel gear 28 disengages clutch 25, as has been previously explained, it being understood that during this operation, the neck ring is also closed. This completes the cycle of one head, one or more articles, depending upon the structure of the true and fore form devices, having been completed and the five, more or less, other heads being now in their respective positions to effect the same cycle of movement, each of said heads being one stage or position behind its predecessor.

*Multiple neck ring.*—As before stated, one of the essential features of my invention is to provide a means for forming a plurality of articles during each cycle of movement of each set of mechanisms or heads hereinbefore described, and for this purpose I prefer to use a multiple neck ring, the construction of which is best disclosed in Figs. 18, 19, 20, 21 and 22. In describing the preferred construction of neck ring and the vacuum head devices that coöperate therewith, I have used different designating letters and characters from that used for similar parts the more readily understood.

In Fig. 19 is shown a transverse section of the neck ring, shown in plan view in Figs. 18 and 22.

In Figs. 18 and 19, I have omitted the showing of the true forms which coöperate with the said neck ring in the manner hereinbefore described, it being understood however, that the fore form members 49 and true form members 50 are provided with three opposing mold sections to coöperate with the three nose pieces or vacuum heads that coöperate with the neck ring.

It will be noticed that in the multiple neck ring, the vacuum head 91 has an air duct $m$ which allows the air to flow from the central duct 93 in the head 91 to a groove $l$ that is cut in the said head 91, which corresponds with a similar groove $l'$ in the casting $j$ and which lead the air to two other vacuum heads constructed similar to the head 91 and designated 2—2 in the drawings, see particularly Fig. 20, one of said heads being arranged one to each side of the central head 91 but each of said heads 2—2 has its central air duct extended only high enough to communicate with an annular air duct 3, which in turn communicates, through the grooves $l$ and $l'$ with the central duct 93 of the main or central duct head 91.

Each of the side duct heads has a nose at the lower end and flared air discharges and bevel heads 5—5 for engaging the seats in the dividing slide plate $n$, which in the present instance is made fast by screws $a$ to a dividing plate $r$, presently again referred to.

Keyed to the shaft 91 is a spur gear 6 which drives similar gears 7 and 8 keyed to the upper end of the shafts on the heads 2, by means of which when the head 91 is rotated with the vertical shaft 83, the two side heads 2—2 will receive similar motion, it being understood that the construction of the side heads and the central vacuum head is such that communication is at all times established between the several air inlets of the head and the vacuum chamber.

D designates a casting frame which is supported by the rods H.

The two plates $n$ which form the neck ring for the three articles are secured by the plate $r$ by means of the two screws $a$ before referred to, and the said plates $r$ slide in grooves cut in the disk $v$ which carries a rack $p$, see Fig. 18, upon which are mounted oppositely disposed guides $q$ in which the dividing plates $n$ and $n$ are slidably held, the said disk $v$ also carrying pins $h$ which act in the cam slots $w$ and $w'$, as clearly shown in Fig. 18.

$e$ designates a guide integral with the frame $u$ that projects radially therefrom as shown in Figs. 18, 21 and 22. The rack $f$ moves vertically in the said guide and the said rack is held to be engaged by the spur gear $g$, the shaft of which is mounted in a bearing on the casing $u$ and the said bearing carries a bevel gear $i$ which engages a segmental rack $f$, as clearly shown.

$c$ designates a post which is utilized to carry the frame $j$ with disk $v$ as the latter revolves.

$s$ designates a disk which is held stationary on the frame by screws $e$ and bearing cam slots $x'$, $y'$ and $d'$, and $t$ designates a disk which is held to move freely and which has a cam slot $t$ corresponding to $d$ and which also has arms 101 and 102 which open and close the several neck rings, as explained in the eleventh movement.

The mechanisms shown in Figs. 18 to 22 are designed for the purpose of using the machine either with the single or multiple neck rings and with a minimum change of parts, the only change necessary being that the plates $n$ are provided for a proper adjustment of the cam slots for the pins $k$.

When the single neck ring is to be used, the rack $f$ is disconnected from the cylinder $53^a$ and then the cam $t$ opens and closes the ring exactly in the manner disclosed in Figs. 14 and 15, since the slot of proper shape is cut in the stationary slot $s$ to allow the pin $h$ to operate.

The several frames are opened and closed as before and in a direction at right angles to each other, and as the fore-form opens and the three articles are left sustained along one diameter of the neck ring frame, if the true form were now closed, the cavities or molds would be in a line perpendicular to that with the suspended articles or masses of molten glass, and to obviate this, the neck ring must be turned 90° while the forms are in their mid position. Rack $f$ now being secured to the cylinder $53^a$, moves the gear $g$ which drives rack $p$ and the three gears $i$.

As a further explanation of the operation of my machine, supposing that the fore form is to open and the true form is to close about the glass, cylinder $53^a$ which carries the rack $f$, and which only has a few teeth and drives the rack $p$ for only a short time, and at the mid-position of the forms or nearly so. Now as the plate $v$ turns the casting $j$ containing the rotating vacuum head is carried around by the base $c$ secured to part $v$ and is sliding vertically on a sleeve secured to J. When adjustments are made for a multiple form, screws $e$ are removed until the plate $s$ is turned 90° and the pins $h$ coincide with the cam slots $w$, it being understood that the pins now being used extend only through the three plates $s$. As plate $v$ is rotated when closing the true form, the pin $h$ is traveling in cam-way $w$ which is an arc of the circle with the center coinciding with that of the disk $v$, therefore the pin $h$ is then held at the same distance from the center and the neck ring not opening.

After the article is finished, the forming devices move to their mid-position, as previously described and the neck ring opens. This latter operation is done when rack $f$ begins to descend with the cylinder $53^a$ and drives the disk $v$ clock-wise. When it has nearly reached the mid-position, pin $h$ is forced by the tongue $y$ out of cam $w$ and into the cam $x$, thus opening the neck ring and releasing the article. As the movement is now completed, the pin $h$ is again driven into the cam $w$.

Having thus described my invention, what I claim and desire to secure by Letters Patent, is:

1. In a glass working apparatus, a dipping head, a blank mold and a body mold thereon, each of said molds having relatively a plurality of glass receiving and shaping cavities, means for simultaneously gathering the molten mass in all the cavities in the blank mold and for subsequently blowing the forming blanks to the desired form when contained in the body mold, and a means for closing the body mold around the shaped blank as the blank mold moves from engagement with the said shaped blank.

2. Automatic mechanism constructed whereby under one action of movement to gather molten glass mass and simultaneously shape the said mass into a plurality of independent primarily formed bodies and under a subsequent action to impart a final shape to the primarily shaped bodies simultaneously, as set forth.

3. In a glass shaping machine, a mold having two sets of opposing members, one set of which is adapted for giving the initial shaping to the molten glass, the other adapted for the final shaping of the initially shaped glass, means for simultaneously and intermittently bringing the two opposing sets of the mold into and out of operative positions and a means for filling the initially shaping set of molds with molten glass, and then blowing the initially shaped mass when it is surrounded by the final shaping mold members.

4. In a glass shaping machine, the combination with an open bottom mold; of a means for moving the said open bottom mold into a pool of molten glass, a vacuum pump which acts under one direction of movement to fill the mold with glass and on the other direction of movement as a blower, means for moving the mold away from the pool and closing the bottom thereof as the pump acts to blow the molten mass and means for closing the bottom of the mold during the blowing operation.

5. In a machine of the character described, the combination of the simultaneously movable parison and blowing molds, an air exhausting device connected therewith, the parison portion having a filling aperture adapted to be brought into operative relation with a mass of molten glass when the air is exhausted from the mold, and means for adjusting the blowing mold to inclose the parison as the parison mold is disengaged therefrom and means for then blowing the said parison.

6. In a glass article making machine, a mold head, a parison and a blowing mold hingedly connected thereto, a mechanism for gathering a portion of the mass into the mold for forming a parison and subsequently blowing the parison in the blowing mold, and means for cutting off the parison from the mass.

7. In a machine of the character described, the combination with a parison and a blowing mold and a neck ring to which both molds are secured; of an air pump that under one operation fills the parison mold by suction, and under a subsequent operation blows the parison, means for cutting off the parison, and mechanism for moving the parison in position to be blown by the pump.

8. In a machine of the character described, a combined parison and blowing mold, a pump that coöperates with both molds and is arranged for gathering the molten mass directly into the parison mold under one movement and for blowing the parison in the mold under another movement, and means for moving the parison to the blowing point.

9. In a machine of the character described, a parison mold and a blowing mold coöperatively connected, a frame on which said molds are supported and an air pump mounted on said frame and connected with the two molds and arranged for first gathering a portion of the glass from the molten mass into the parison mold and afterward effecting the final shaping of said mass by blowing when in the blowing mold.

10. In a machine for shaping glass articles, the combination of coöperating mechanism for simultaneously gathering directly from a mass of molten glass a plurality of quantities of the glass and shaping the said plural quantities and providing each with a blowing opening, a sectional blowing mold having a series of shaping cavities for receiving the several shaped quantities of glass, and a means for simultaneously distributing the glass around the cavities by blowing the said quantities to the desired form.

11. In a machine of the character described, a mold having an opening through which the molten glass may be caused to enter, mechanism for moving the open end of the mold into operative relation to a mass of molten glass and a single means that operates under one movement for drawing the glass partially through the opening in the mold and under another movement for blowing the glass filling drawn into the mold.

12. In a glass shaping machine, the combination with an open bottom mold, means for moving the bottom of said mold into operative relation to a pool of glass, and simultaneously exhausting the air therefrom and moving the filling mold away from the pool and then blowing the filling to the desired shape, as set forth.

13. The combination of a blank form; a mold having a filling aperture, means for lowering and raising the apertured end of the mold into and out of a mass of molten glass, and air controlling means connected with the mold, adapted under one operation to create a partial vacuum for filling the mold and initially forming a blank and under another operation to blow the said blank to shape, and an adjustable closure member for the mold.

14. A glass gathering or shaping machine which comprises separate pairs of mold members adapted under one adjustment to initially shape the blank and under another adjustment to provide the finishing form for the blank, a horizontally acting cut off for engaging with the bottom of the mold members in either of their adjustments and an air controlling means connected with the said mold members, adapted when they are adjusted for the initial forming of the blank to exhaust air therefrom and gather the filling therein, and when the said mold members are adjusted for the final forming and the cut off closes the lower end of the mold members to force air under pressure into the filling within the said mold members.

15. The combination of separate pairs of mold members adapted under one adjustment to form a holder for the parison and under another adjustment to form a blowing or final forming holder, and a single means coöperatively connected with the said mold members, adapted when they are adjusted as a parison holder to exhaust the air therefrom whereby to gather the material therein, and when they are adjusted for the final forming to blow the said parison.

16. In a glass shaping machine, the combination of two sets of mold members adapted under one adjustment to form a parison mold, and under another adjustment to form a blowing mold, in combination with means for causing the molten glass to flow from the supply thereof into the mold members when they are adjusted as a parison mold and to then shape the parison or blank to its final form when the mold members are arranged to form a blowing mold.

17. In a machine of the character described, a central support, a rotary carrier, a series of independent mechanisms or heads on the rotary carrier and gear mechanism joining the said heads with actuating gear mechanisms on the carrier for elevating and lowering the heads at predetermined times, separate pairs of mold members carried by each head arranged under one adjustment to constitute a parison mold and under another adjustment to constitute a blowing mold, mechanism for automatically adjusting the said mold members as their heads are raised or lowered and travel forward and automatic means on each head, adapted when the head is lowered and the mold members are adjusted as a parison mold to fill the said parison mold by suction, and when the head is raised and is traveling forward and the mold members are adjusted as a blowing mold to blow the parison or blank within the said blowing mold to its final shape.

18. In a glass shaping machine, the combination with separate pairs of molds, means for adjusting them whereby to adapt them first as a parison, and secondly as a blowing mold; of mechanism for moving the mold members when adjusted as a parison mold into operative relation to a supply of molten glass, and a single means coöperating with the mold members adapted when the said members are adjusted as a parison mold to gather a charge of molten glass from a supply to form a parison when the said mold members are arranged as a blowing mold to expand the parison or blank within the said blowing mold to its final form.

19. In a glass shaping machine, two pairs of mold members, each pair of mold members being adapted, under one adjustment to act as a parison mold and under another adjustment to act as a blowing mold and means for adjusting the mold members at predetermined times, and another means coöperatively connected with the mold members for creating a vacuum therein when they are adjusted as a parison mold and for forcing air out under pressure into the said mold members when they are adjusted as a blowing mold.

20. In a glass shaping means, two pairs of mold members adapted under one adjustment for initially forming a blank and under another adjustment to serve as a blowing mold, means for first moving the mold members into position for engaging with a mass of molten glass and then moving the mold members away from the mass of molten glass, a pump coöperatively joined with the mold members and automatic means for actuating the pump whereby to create a vacuum in the mold members when they are lowered and adjusted as an initially forming mold and to cause the said pump to blow air under pressure into the initially forming blank when the mold members are adjusted as a final or blowing mold.

21. A mold comprising an adjustable neck and adjustable fore forming members and final or finished forming members, mechanism for moving the mold into position to engage with a mass of molten glass when said mold is adjusted as a blank forming mold, and then moving the said mold from the molten glass when it is adjusted as a finishing mold, a pump joined with the mold and an automatic means for actuating the pump whereby to first create a vacuum in the mold when it is lowered and adjusted as a blank forming mold and then forcing air under pressure in the forming blank, when the mold is adjusted as a finishing mold, as set forth.

22. In a glass shaping machine, a mold head comprising a neck formed of separable sections, a blank forming mold having an open ended body portion and a finishing mold of substantially the same internal length, combined with the said separable neck, in connection with an air controlling means, adapted under one operation to fill the blank forming mold through the open end of the body portion thereof whereby to form a blank and to blow the said blank when the finishing mold sections of the mold head surround the blank, as set forth.

23. In a glass shaping machine, a neck portion, a blank forming mold having an open ended body portion and a finishing mold having substantially the same length as the blank forming mold, the two molds being coöperatively connected with the neck, means for moving the blank forming mold and the finished mold sections intermittently and simultaneously into and out of an operative position and a single air controlling means, adapted when the blank forming mold is in operative position to creat a suction into said mold and when the finishing mold is in an operative position, to force air under pressure into the said mold.

24. In a glass shaping machine, a traveling frame, a plurality of heads mounted thereon, mold mechanism mounted on each head, comprising a separable neck, members for initially forming the blank, other members that form the finishing mold, means for intermittently and simultaneously moving the blank forming members and the finishing mold into and out of operative position, means for exhausting the air from the mold when the blank forming members are in position, and for blowing air into the mold when the finished mold sections are in position and a means for positively closing the lower end of the mold during the blowing operation, as set forth.

25. In a machine of the character described, the combination of a plurality of molds, a core for each mold, and means for simultaneously gathering the molten glass into the molds and around the cores to form a plurality of independent blanks and another means for rotating the several cores as the glass is being gathered, as set forth.

26. In a machine of the character described, the combination of a mold, a core having a central air passage that terminates in lateral discharge orifices near the lower end of the core and an air pump connected with the core, adapted to draw air into the end of the core and under another operation to discharge the air under pressure through the core, for the purposes described.

27. In a machine of the character described, the combination of a mold, a core having a central air passage that discharges into the mold, an air pump connected with the core adapted under one operation to draw air from the mold into the lower end of the core, and under another operation to discharge the air under pressure through the core and a means for rotating the core, for the purposes described.

28. In a machine of the character described, the combination of a mold, a core having a central air passage that discharges into the mold, an air pump connected with the core, adapted under one operation to draw air into the lower end of the core from the mold and under the other operation to discharge air under pressure through the core and means for imparting vertical motion to the core, as set forth.

29. In a machine of the character described, the combination of a mold, a core having a central air passage that opens into the mold, an air pump connected with the core, adapted under one operation to draw the air from the mold through the core and under another operation to force air under pressure through the core and means for imparting simultaneous rotary and vertical motion to the core.

30. In a machine of the character described, the combination of a plurality of molds, a core for each mold, each core having an air passage, and the air passages of the several cores being in communication, a pump connected with the air passage, one of the cores adapted under one operation to draw air from the several molds through the cores and under another operation to force air under pressure though the several cores, for the purposes specified.

31. In a machine for the manufacture of hollow glass articles, the combination of a mold, a core having an air passage that opens into the mold, a pump connected with the core, and automatic means for placing the core in communication with the atmosphere, at predetermined times.

32. In a machine for the manufacture of hollow glass ware, the combination with a mold; of a core having an air passage that opens into the mold, a pump connected with the core and automatic means for placing the core in communication with atmosphere at predetermined times as the pump is making its stroke.

33. In a machine for the manufacture of hollow glass articles, the combination of a mold, a core having an air passage that opens into the mold, a pump in communication with the said air passage, and a means for cutting out the suction and compression actions of the pump from the mold, at times.

34. In a machine for the manufacture of hollow glass articles, the combination of a mold, a core having an air passage that communicates with the mold, a pump in communication with the air passage of the core and automatic mechanisms for rotating the core and for cutting out the compression and suction actions of the pump as the pump piston is actuated, as set forth.

35. In a machine for the manufacture of hollow glass ware, a core having an air passage that opens into the mold, a suction means connected with the core and in communication with the air passage and means for placing the core with its air passage in communication with the atmosphere to stop the gathering action of the suction means.

36. In a machine for the manufacture of hollow glass articles, the combination of a mold, a core having an air passage that communicates with the mold, a pump in communication with the air passage of the core and automatic mechanisms for rotating and reciprocating the core as the pump piston is actuated, for the purposes specified.

37. In a machine for the manufacture of hollow glass ware, the combination of a plurality of molds, a plurality of cores, one for each mold, one of the cores having an extended stem and an aperture communicating with its respective mold and in communication with apertures that extend down through the other cores, a means for rotating the core having the stem, gear connections joining the said rotatable core with the other cores for imparting a rotary motion thereto, a pump in communication with the core having the stem, and an automatic means for raising and lowering the several cores in unison at predetermined times.

38. In a machine of the character described, the combination of a frame, a head section connected thereto for rotary and vertical movement, a separable neck ring supported on the head, a two part blank mold hinged to and pendently supported from the head, the two part blowing mold likewise supported on the head but positioned at right angles to the other mold members, a single core for the double sets of mold members, having an air feed groove that opens in the mold, automatic means for opening and closing the two sets of mold members and the neck ring, a pump in communication with an air feed in the core and means for actuating the pump to create a vacuum when the blank mold members close and for forcing out air under pressure when the blowing mold members are closed, as set forth.

39. In a glass shaping machine, a rotary carrier, a plurality of independent mechanisms or heads of like construction supported on the carrier, each of said mechanisms including a blank mold and a blowing mold, coöperatively joined and adapted to alternately open and close, means for causing molten glass to flow from the supply into the blank mold when the latter is closed during the rotation of the carrier and for then blowing the blank, and means on the carrier that automatically and simultaneously operate at predetermined times for effecting the opening and closing of the two molds and for actuating the glass drawing and blowing means.

40. In a machine of the character described, in combination with a central support, a plurality of heads sustained by and rotatable about the central support, a neck ring mounted on each head, a separable blank mold and a separable blowing mold coöperating with each neck ring and hingedly sustained on their respective heads, said blowing and blank molds being positioned at right angles to each other, an apertured core or vacuum head for each set of separable molds, a pump in connection with the said vacuum head and automatic mechanism mounted on the central support and heads for controlling the hinged mold sections and operating the pump at predetermined times.

41. In a machine of the character described, a rotary carrier, a plurality of forms mounted thereon, each form including fore form members and true form members, means for alternately bringing one set of said form members into operative position as the other set of members are moved out of operative position, the centrally apertured core common to both sets of forms and an air controlling means in communication with the core, adapted under one operation to create a suction through the core and under another operation to force air out through the said core under pressure for blowing.

42. In a machine of the character stated, a neck ring having two opposing and separable mold sections, manually operating means for setting said sections to a closed position and automatic devices for opening said sections, as set forth.

43. In a machine of the character stated, a neck ring comprising a supporting plate having a central opening, a pair of opposing neck mold members, slidably mounted on the plate, another plate rotatable about the axis of the ring, connections that join said rotatable plate to the mold slides for reciprocating the said slides as the plate is rotated, and automatic means for rotating the plate, as set forth.

44. In a machine of the character described, a neck ring having slide members formed with a plurality of mold faces for forming the neck of the article to be made and a vacuum head mounted on the said ring, said head including three distinct cores, one for each set of mold faces in the neck ring plates, each of the said cores having an air passage that opens into the neck molds, the several air passages of the cores communicating with each other, one of said cores having its air passage in communication with a pump and means for actuating the said pump, for the purposes described.

45. The combination of a head having a plurality of blank molds and a plurality of blowing molds, means for removing the blank molds from about the blank, and simultaneously inclosing the said blank with the blowing molds at predetermined times, and an automatic means for forming a plurality of blanks simultaneously and then simultaneously blowing the said blanks into hollow articles.

46. In a machine of the character described, a rotary carrier, a head mechanism mounted thereon to rotate therewith, said mechanism being vertically reciprocable relatively to the rotary carrier and means for imparting reciprocation to the head at intervals, the said head including a pump cylinder, a pair of oppositely movable cylinders, slidable upon the cylinder, a neck ring supported from the head, a pair of oppositely disposed blank molds hingedly suspended from the head and having lateral connections with the reciprocating cylinder, a pair of blowing molds disposed at right angles to the blank molds hingedly connected to the head and having lateral connections with the other reciprocable cylinder, means for imparting alternate movements to the two cylinders, whereby to open and close the two pairs of molds alternately, a vacuum head, a core extended down into the neck ring, means for raising or lowering the said core and rotating it, said core having an air channel extended its length and opening through the core at the upper and lower ends, the upper end of the core extending into the suction and compression end of the pump cylinder and automatic devices for raising the core at times, as set forth.

47. In a machine for shaping glass, a parison head and a blowing head, each of said heads having a plurality of molds of like number, another head having a plurality of cores, one for each mold in the parison or in the blowing head, means for adjusting the core heads to coöperate with either the parison or blowing head and means connected with the core head adapted under one adjustment to fill the parison mold and under another adjustment to blow the fillings in the said mold and expanding them into the blowing mold.

CHRISTIAN JULIUS KOENIG.

Witnesses:
HENRY O. TONSOR,
HENRY MEYERS.